United States Patent
Qi

(10) Patent No.: US 12,469,514 B2
(45) Date of Patent: Nov. 11, 2025

(54) SYSTEMS AND METHODS FOR AUDIO SIGNAL GENERATION

(71) Applicant: SHENZHEN SHOKZ CO., LTD., Guangdong (CN)

(72) Inventor: Xin Qi, Shenzhen (CN)

(73) Assignee: SHENZHEN SHOKZ CO., LTD., Shenzhen (CN)

(*) Notice: Subject to any disclaimer, the term of this patent is extended or adjusted under 35 U.S.C. 154(b) by 276 days.

(21) Appl. No.: 18/328,760

(22) Filed: Jun. 4, 2023

(65) Prior Publication Data
US 2023/0317092 A1 Oct. 5, 2023

Related U.S. Application Data

(63) Continuation of application No. PCT/CN2021/093790, filed on May 14, 2021.

(51) Int. Cl.
*G10L 21/0232* (2013.01)
*G10L 15/02* (2006.01)
(Continued)

(52) U.S. Cl.
CPC .......... *G10L 21/0232* (2013.01); *G10L 15/02* (2013.01); *G10L 15/063* (2013.01);
(Continued)

(58) Field of Classification Search
CPC ................ G10L 21/0232; H04R 2460/13
See application file for complete search history.

(56) References Cited

U.S. PATENT DOCUMENTS

2006/0287852 A1* 12/2006 Liu ................ G10L 21/0208
704/228
2016/0217122 A1* 7/2016 Ji ........................ G06N 20/00
(Continued)

FOREIGN PATENT DOCUMENTS

| CN | 109982179 A | 7/2019 |
|---|---|---|
| WO | 2020225294 A1 | 11/2020 |
| WO | 2021046796 A1 | 3/2021 |

OTHER PUBLICATIONS

Demiroglu, C., & Anderson, D. V. (2004, November). Broad phoneme class recognition in noisy environments using the GEMS. In Conference Record of the Thirty-Eighth Asilomar Conference on Signals, Systems and Computers, 2004. (vol. 2, pp. 1805-1808). IEEE.*

(Continued)

*Primary Examiner* — Bryan S Blankenagel
(74) *Attorney, Agent, or Firm* — METIS IP LLC

(57) ABSTRACT

The method for audio signal generation may include obtaining a bone conduction audio signal and an air conduction audio signal. The method may also include obtaining a trained machine learning model that provides a mapping relationship between a set of bone conduction data derived from a specific bone conduction audio signal and one or more sets of equivalent air conduction data derived from a specific equivalent air conduction audio signal. The method may also include determining a target set of equivalent air conduction data corresponding to the bone conduction audio signal using the trained machine learning model based on the bone conduction audio signal and the air conduction audio signal. The method may further include causing an audio signal output device to output a target audio signal representing the speech of the user based on the target set of equivalent air conduction data.

20 Claims, 10 Drawing Sheets

(51) Int. Cl.
  *G10L 15/06* (2013.01)
  *G10L 15/14* (2006.01)
  *G10L 15/18* (2013.01)
  *H04R 1/08* (2006.01)
  *H04R 23/02* (2006.01)
  *G10L 21/0216* (2013.01)

(52) U.S. Cl.
  CPC ........ G10L 15/142 (2013.01); G10L 15/1815 (2013.01); H04R 1/08 (2013.01); H04R 23/02 (2013.01); *G10L 2015/025* (2013.01); *G10L 2015/027* (2013.01); *G10L 2021/02165* (2013.01); *H04R 2460/13* (2013.01)

(56) References Cited

U.S. PATENT DOCUMENTS

| | | | |
|---|---|---|---|
| 2019/0012447 | A1 | 1/2019 | Lesso |
| 2020/0372925 | A1* | 11/2020 | Chen ................... G10L 21/0308 |
| 2020/0374648 | A1 | 11/2020 | Robinson et al. |
| 2021/0072821 | A1* | 3/2021 | von und zu Liechtenstein ........... G02C 7/086 |
| 2023/0276165 | A1* | 8/2023 | Zhu ......................... H04R 3/04 381/380 |
| 2023/0290333 | A1* | 9/2023 | Tiefenau ............... G10L 13/047 |

OTHER PUBLICATIONS

Zhang, Zhengyou et al., Multi-Sensory Microphones for Robust Speech Detection, Enhancement and Recognition, 2004 IEEE International Conference on Acoustics, Speech, and Signal Processing, 781-784, 2004.

Jasha Droppo et al., Evaluation of Splice on the Aurora 2 and 3 Tasks, ICSLP 2002: 7th International Conference on Spoken Language Processing, 29-32, 2002.

The Extended European Search Report in European Application No. 21941373.9 mailed on Nov. 30, 2023, 11 pages.

International Search Report in PCT/CN2021/093790 mailed on Feb. 17, 2022, 4 pages.

Written Opinion in PCT/CN2021/093790 mailed on Feb. 17, 2022, 4 pages.

\* cited by examiner

SYSTEMS AND METHODS FOR AUDIO SIGNAL GENERATION

CROSS-REFERENCE TO RELATED APPLICATIONS

This application is a continuation of International Application No. PCT/CN2021/093790, filed on May 14, 2021, the contents of which are hereby incorporated by reference.

TECHNICAL FIELD

The present disclosure generally relates to signal processing fields, and specifically, to systems and methods for audio signal generation based on a bone conduction audio signal and an air conduction audio signal.

BACKGROUND

With the widespread use of electronic devices, communication between people is becoming more and more convenient. When using an electronic device for communication, a user can rely on a microphone (e.g., a bone conduction microphone or an air conduction microphone) to obtain audio signals when the user speaks. The audio signal acquired by the microphone may represent a speech of the user. However, sometimes it is difficult to ensure that the audio signals acquired by the microphone are sufficiently intelligible. For example, a bone conduction audio signal acquired by a bone conduction microphone may lose some important information. An air conduction audio signal acquired by an air conduction microphone may have a count of noises. Thus, it is desirable to provide systems and methods for generating an audio signal with fewer noises and better fidelity.

SUMMARY

According to an aspect of the present disclosure, a system for audio signal generation may be provided. The system may include at least one storage medium and at least one processor in communication with the at least one storage medium. The at least one storage medium may include a set of instructions. When the at least one processor execute the set of instructions, the at least one processor may be directed to cause the system to perform one or more of the following operations. The system may obtain a bone conduction audio signal acquired by a bone conduction sensor and an air conduction audio signal acquired by an air conduction sensor. The bone conduction audio signal and the air conduction audio signal may represent a speech of a user. The system may also obtain a trained machine learning model that provides a mapping relationship between a set of bone conduction data derived from a specific bone conduction audio signal and one or more sets of equivalent air conduction data derived from a specific equivalent air conduction audio signal. The system may also determine a target set of equivalent air conduction data corresponding to the bone conduction audio signal using the trained machine learning model based on the bone conduction audio signal and the air conduction audio signal. The target set of equivalent air conduction data may indicate a semantic content of the speech of the user. The system may further cause an audio signal output device to output a target audio signal representing the speech of the user based on the target set of equivalent air conduction data.

In some embodiments, to determine a target set of equivalent air conduction data corresponding to the bone conduction audio signal based on the bone conduction audio signal and the air conduction audio signal, the system may determine the one or more sets of equivalent air conduction data corresponding to the bone conduction audio signal using the trained machine learning model based on the bone conduction audio signal. The system may further identify the target set of equivalent air conduction data from the one or more sets of equivalent air conduction data based on the air conduction audio signal.

In some embodiments, to determine one or more sets of equivalent air conduction data corresponding to the bone conduction audio signal using the trained machine learning model based on the bone conduction audio signal, the system may input the bone conduction audio signal into the trained machine learning model to obtain the one or more sets of equivalent air conduction data corresponding to the bone conduction audio signal.

In some embodiments, to determine one or more sets of equivalent air conduction data corresponding to the bone conduction audio signal using the trained machine learning model based on the bone conduction audio signal, the system may extract bone conduction acoustic characteristics from the bone conduction audio signal. The system may also determine the set of bone conduction data based on the bone conduction acoustic characteristics. The system may further input the set of bone conduction data into the trained machine learning model to obtain the one or more sets of equivalent air conduction data corresponding to the bone conduction audio signal.

In some embodiments, to identify the target set of equivalent air conduction data from the one or more sets of equivalent air conduction data based on the air conduction audio signal, the system may extract air conduction acoustic characteristics from the air conduction audio signal. The system may also determine a set of air conduction data based on the air conduction acoustic characteristics. For each of the one or more sets of equivalent air conduction data, the system may also determine a correlation degree between the set of equivalent air conduction data and the set of air conduction data. The system may also determine one of the one or more sets of equivalent air conduction data that has a maximum correlation degree with the set of air conduction data among the one or more sets of equivalent air conduction data. The system may further determine the target set of equivalent air conduction data based on the one of the one or more sets of equivalent air conduction data.

In some embodiments, to cause an audio signal output device to output a target audio signal representing the speech of the user based on the target set of equivalent air conduction data, the system may convert the target set of equivalent air conduction data into a target equivalent air conduction audio signal. The system may also determine the target audio signal based on the target equivalent air conduction audio signal. The system may further cause the audio signal output device to output the target audio signal.

In some embodiments, the target audio signal may include a noise level less than a noise level of the air conduction audio signal.

In some embodiments, to determine the target audio signal based on the target equivalent air conduction audio signal, the system may generate the target audio signal by adding noises in the target equivalent air conduction audio signal.

In some embodiments, to generate the trained machine learning model, the system may perform one or more of the following operations. The system may obtain a plurality of groups of training data. Each group of the plurality of groups of training data may include a first audio signal and a second audio signal representing a same speech sample. The first audio signal may be acquired by a bone conduction audio acquisition device and the second audio signal may be acquired by an air conduction audio acquisition device under a noiseless condition. The system may train a preliminary machine learning model using the plurality of groups of training data to obtain the trained machine learning model.

In some embodiments, the preliminary machine learning model may be constructed based on a hidden Markov model.

In some embodiments, to train a preliminary machine learning model using the plurality of groups of training data to obtain the trained machine learning model, the system may extract first acoustic characteristics from the first audio signal. The system may also extract second acoustic characteristics from the second audio signal. The system may also determine one or more first sets of bone conduction data based on the first acoustic characteristics. The system may also determine one or more second sets of air conduction data based on the second acoustic characteristics. The system may further determine multiple pairs of air conduction data and bone conduction data, each pair includes a first set of bone conduction data and a second set of air bone conduction data that represents same semantics. The system may further establish a mapping relationship between each of the one or more first sets of bone conduction data and at least one of the one or more second sets of air conduction data based on the multiple pairs of air conduction data and bone conduction data.

In some embodiments, each of the one or more first sets of bone conduction data and the one or more second sets of air conduction data may include a syllable that is composed of one or more phonemes.

In some embodiments, the trained machine learning model may provide a mapping relationship between each syllable in the bone conduction audio signal with one or more syllables in the air conduction audio signal.

In some embodiments, the mapping relationship between each syllable in the bone conduction audio data with one or more syllables in the one or more sets of equivalent air conduction data may include a probability that each syllable in the bone conduction audio data matches each of one or more syllables in the one or more sets of equivalent air conduction data.

According to another aspect of the present disclosure, a system for audio signal generation may be provided. The system may include at least one storage medium and at least one processor in communication with the at least one storage medium. The at least one storage medium may include a set of instructions. When the at least one processor execute the set of instructions, the at least one processor may be directed to cause the system to perform one or more of the following operations. The system may obtain a bone conduction audio signal acquired by a bone conduction sensor and an air conduction audio signal acquired by an air conduction sensor. The bone conduction audio signal and the air conduction audio signal may represent a speech of a user. The system may also obtain a trained machine learning model. The system may generate a target audio signal representing the speech of the user using the trained machine learning model based on the bone conduction audio signal and the air conduction audio signal. The system may further cause an audio signal output device to output the audio signal. The target audio signal may have a noise level less than a noise level of the air conduction audio signal.

According to yet another aspect of the present disclosure, a method for audio signal generation may be provided. The method may include obtaining a bone conduction audio signal acquired by a bone conduction sensor and an air conduction audio signal acquired by an air conduction sensor. The bone conduction audio signal and the air conduction audio signal may represent a speech of a user. The method may also include obtaining a trained machine learning model that provides a mapping relationship between a set of bone conduction data derived from a specific bone conduction audio signal and one or more sets of equivalent air conduction data derived from a specific equivalent air conduction audio signal. The method may also include determining a target set of equivalent air conduction data corresponding to the bone conduction audio signal using the trained machine learning model based on the bone conduction audio signal and the air conduction audio signal. The target set of equivalent air conduction data may indicate a semantic content of the speech of the user. The method may further include causing an audio signal output device to output a target audio signal representing the speech of the user based on the target set of equivalent air conduction data.

According to yet another aspect of the present disclosure, a method for audio signal generation may be provided. The method may include obtaining a bone conduction audio signal acquired by a bone conduction sensor and an air conduction audio signal acquired by an air conduction sensor. The bone conduction audio signal and the air conduction audio signal may represent a speech of a user. The method may also include obtaining a trained machine learning model. The method may also include generating a target audio signal representing the speech of the user using the trained machine learning model based on the bone conduction audio signal and the air conduction audio signal. The method may further include causing an audio signal output device to output the audio signal, wherein the target audio signal has a noise level less than a noise level of the air conduction audio signal.

According to yet another aspect of the present disclosure, a system for audio signal generation may be provided. The system may include an acquisition module, a determination module, and an output module. The acquisition module may be configured to obtain a bone conduction audio signal acquired by a bone conduction sensor, an air conduction audio signal acquired by an air conduction sensor, and a trained machine learning model that provides a mapping relationship between a set of bone conduction data derived from a specific bone conduction audio signal and one or more sets of equivalent air conduction data derived from a specific equivalent air conduction audio signal. The bone conduction audio signal and the air conduction audio signal may represent a speech of a user. The determination module may be configured to determine a target set of equivalent air conduction data corresponding to the bone conduction audio signal using the trained machine learning model, the target set of equivalent air conduction data indicating a semantic content of the speech of the user based on the bone conduction audio signal and the air conduction audio signal. The output module may be configured to cause an audio signal output device to output a target audio signal representing the speech of the user based on the target set of equivalent air conduction data.

According to yet another aspect of the present disclosure, a system for audio signal generation may be provided. The system may include an acquisition module, a determination module, and an output module. The acquisition module may be configured to obtain a bone conduction audio signal acquired by a bone conduction sensor, an air conduction audio signal acquired by an air conduction sensor, and a trained machine learning model. The bone conduction audio signal and the air conduction audio signal may represent a speech of a user. The determination module may be configured to generate a target audio signal representing the speech of the user using the trained machine learning model based on the bone conduction audio signal and the air conduction audio signal. The output module may be configured to cause an audio signal output device to output the audio signal. The target audio signal may have a noise level less than a noise level of the air conduction audio signal.

According to yet another aspect of the present disclosure, a non-transitory computer readable medium may be provided. The non-transitory computer readable medium may include a set of instructions for audio signal generation. When executed by at least one processor, the set of instructions may direct the at least one processor to perform a method. The method may include obtaining a bone conduction audio signal acquired by a bone conduction sensor and an air conduction audio signal acquired by an air conduction sensor. The bone conduction audio signal and the air conduction audio signal may represent a speech of a user. The method may also include obtaining a trained machine learning model that provides a mapping relationship between a set of bone conduction data derived from a specific bone conduction audio signal and one or more sets of equivalent air conduction data derived from a specific equivalent air conduction audio signal. The method may also include determining a target set of equivalent air conduction data corresponding to the bone conduction audio signal using the trained machine learning model based on the bone conduction audio signal and the air conduction audio signal. The target set of equivalent air conduction data may indicate a semantic content of the speech of the user. The method may further include causing an audio signal output device to output a target audio signal representing the speech of the user based on the target set of equivalent air conduction data.

According to yet another aspect of the present disclosure, a non-transitory computer readable medium may be provided. The non-transitory computer readable medium may include a set of instructions for audio signal generation. When executed by at least one processor, the set of instructions may direct the at least one processor to perform a method. The method may include obtaining a bone conduction audio signal acquired by a bone conduction sensor and an air conduction audio signal acquired by an air conduction sensor. The bone conduction audio signal and the air conduction audio signal may represent a speech of a user. The method may also include obtaining a trained machine learning model. The method may also include generating a target audio signal representing the speech of the user using the trained machine learning model based on the bone conduction audio signal and the air conduction audio signal. The method may further include causing an audio signal output device to output the audio signal, wherein the target audio signal has a noise level less than a noise level of the air conduction audio signal.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
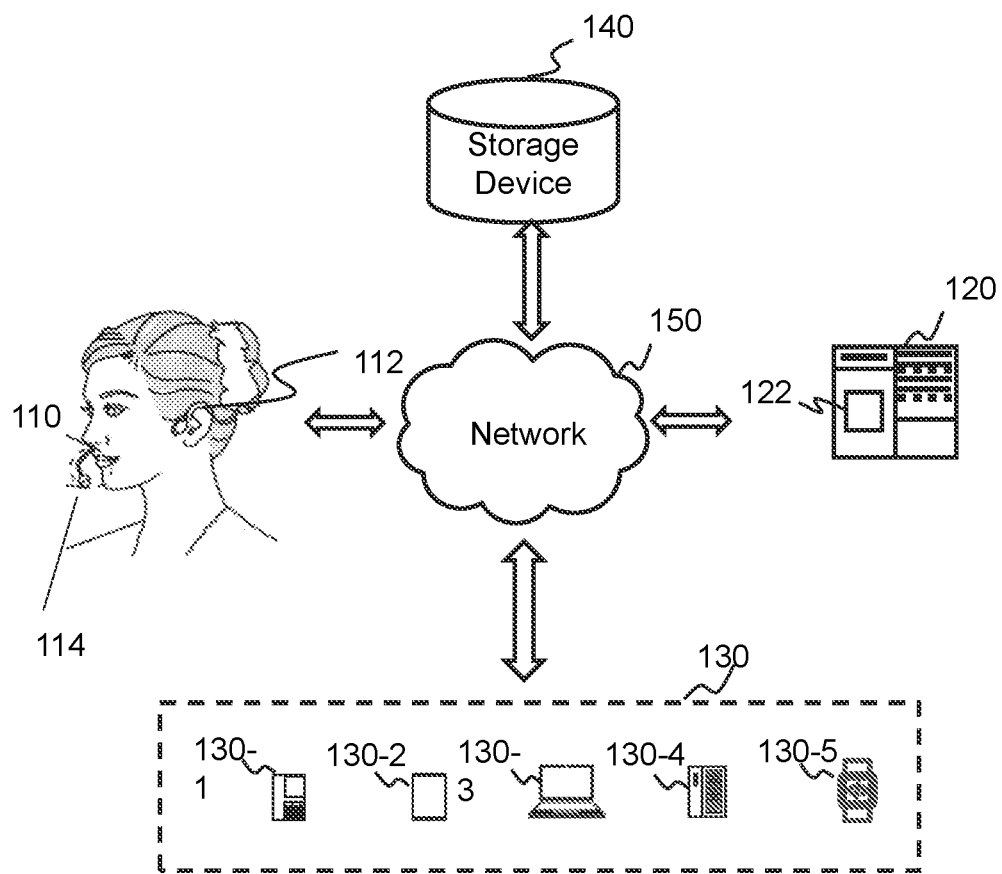
FIG. 1 is a schematic diagram illustrating an exemplary audio signal generation system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption before execution). Such software code may be stored, partially or fully, on a storage device of the executing computing device, for execution by the computing device. Software instructions may be embedded in firmware, such as an erasable programmable read-only memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module, or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for audio signal generation. The systems may obtain bone conduction audio signal collected by a bone conduction audio signal acquired by a bone conduction sensor and an air conduction audio signal acquired by an air conduction sensor. The bone conduction audio signal and the air conduction audio signal may represent a speech of a user. The systems may also obtain a trained machine learning model that provides a mapping relationship between a set of bone conduction data derived from the bone conduction audio signal and one or more sets of equivalent air conduction data. The systems may further determine a target set of equivalent air conduction data corresponding to the bone conduction audio signal using the trained machine learning model based on the bone conduction audio signal and the air conduction audio signal. The target set of equivalent air audio data may indicate a semantic content of the speech of the user. The systems may further cause an audio signal output device to output a target audio signal representing the speech of the user based on the target set of equivalent air conduction data. Compared with the bone conduction audio signal, the systems and methods of the present disclosure may generate the target audio signal with improved fidelity that includes more frequency components than the bone conduction audio signal. Compared with the air conduction audio signal, the systems and methods of the present disclosure may generate the target audio signal with a lower noise level than the air conduction audio signal.

FIG. 1 is a schematic diagram illustrating an exemplary audio signal generation system 100 according to some embodiments of the present disclosure. The audio signal generation system 100 may include an audio collection device 110, a server 120, a terminal 130, a storage device 140, and a network 150.

The audio collection device 110 may obtain audio data (e.g., an audio signal) by collecting a sound, voice, or speech of a user when the user speaks. For example, when the user speaks, the sound of the user may incur vibrations of air around the mouth of the user and/or vibrations of tissues of the body (e.g., the skull) of the user. The audio collection device 110 may receive the vibrations and convert the vibrations into electrical signals (e.g., analog signals or digital signals), also referred to as the audio data. The audio data may be transmitted to the server 120, the terminal 130, and/or the storage device 140 via the network 150 in the form of the electrical signals. In some embodiments, the audio collection device 110 may include a recorder, a headset, such as a blue tooth headset, a wired headset, a hearing aid device, etc.

In some embodiments, the audio collection device 110 may be connected with a loudspeaker via a wireless connection (e.g., the network 150) and/or wired connection. The audio data may be transmitted to the loudspeaker to play and/or reproduce the speech of the user. In some embodiments, the loudspeaker and the audio collection device 110 may be integrated into one single device, such as a headset. In some embodiments, the audio collection device 110 and the loudspeaker may be separated from each other. For example, the audio collection device 110 may be installed in a first terminal (e.g., a headset) and the loudspeaker may be installed in another terminal (e.g., the terminal 130).

In some embodiments, the audio collection device 110 may include a bone conduction microphone 112 and an air conduction microphone 114. The bone conduction microphone 112 may include one or more bone conduction sensors (also referred to as bone conduction assembly) for collecting audio signals (also referred to as bone conduction audio signals) conducted through bones (e.g., the skull) of a user when the user speaks. The bone conduction audio signals may be generated by the bone conduction microphone 112 collecting a vibration signal of the bones (e.g., the skull) of a user when the user speaks. In some embodiments, the one or more bone conduction sensors may form a bone conduction sensor array. In some embodiments, the bone conduction microphone 112 may be positioned at and/or in contact with a region of the user's body for collecting the bone conduction data. The region of the user's body may include the forehead, the neck (e.g., the throat), the face (e.g., an area around the mouth, the chin), the top of the head, a mastoid, an area around an ear or an area inside of an ear, a temple, or the like, or any combination thereof. For example, the bone conduction microphone 112 may be positioned at and/or in contact with the ear screen, the auricle, the inner auditory meatus, the external auditory meatus, etc. In some embodiments, one or more characteristics of the bone conduction data may be different according to the region of the user's body where the bone conduction microphone 112 is positioned and/or in contact with. For example, the bone conduction data collected by the bone conduction microphone 112 positioned at the area around an ear may include high energy than that collected by the bone conduction microphone 112 positioned at the forehead.

The air conduction microphone 114 may include one or more air conduction sensors (also referred to as air conduction assembly) for collecting audio signals (also referred to as air conduction audio signals) conducted through the air when a user speaks. In some embodiments, the one or more air conduction sensors may form an air conduction sensor array. In some embodiments, the air conduction microphone 114 may be positioned within a distance (e.g., 0 cm, 1 cm, 2 cm, 5 cm, 10 cm, 20 cm, etc.) from the mouth of the user. One or more characteristics of the air conduction data (e.g., an average amplitude of the air conduction data) may be different according to different distances between the air conduction microphone 114 and the mouth of the user. For example, the greater the different distance between the air conduction microphone 114 and the mouth of the user is, the less the average amplitude of the air conduction data may be.

In some embodiments, the bone conduction microphone 112 and the air conduction microphone 114 may be integrated into one single device (e.g., the audio collection device 110). In some embodiments, the bone conduction microphone 112 and the air conduction microphone 114 may be integrated into different devices.

In some embodiments, the server 120 may be a single server or a server group. The server group may be centralized (e.g., a data center) or distributed (e.g., the server 120 may be a distributed system). In some embodiments, the server 120 may be local or remote. For example, the server 120 may access information and/or data stored in the terminal 130, and/or the storage device 140 via the network 150. As another example, the server 120 may be directly connected to the terminal 130, and/or the storage device 140 to access stored information and/or data. In some embodiments, the server 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 120 may be implemented on a computing device 200 having one or more components illustrated in FIG. 2 in the present disclosure.

In some embodiments, the server 120 may include a processing device 122. The processing device 122 may process information and/or data related to audio signal generation to perform one or more functions described in the present disclosure. For example, the processing device 122 may obtain a bone conduction audio signal collected by the bone conduction microphone 112 and an air conduction audio signal collected by the air conduction microphone 114. The bone conduction audio signal and the air conduction audio signal may represent a speech of a user. The processing device 122 may also obtain a trained machine learning model that provides a mapping relationship between a set of bone conduction data derived from a specific bone conduction audio signal (e.g., the bone conduction audio signal collected by the bone conduction microphone 112) and one or more sets of equivalent air conduction data. The processing device 122 may generate a target set of equivalent air conduction data corresponding to the bone conduction audio signal based on the bone conduction audio signal and the air conduction audio signal using the trained machine learning model. The target set of equivalent air audio data may indicate a semantic content of the speech of the user and include a noise level less than a noise level of the air conduction audio signal. The processing device 122 may further cause an audio signal output device to output a target audio signal representing the speech of the user based on the target set of equivalent air conduction data.

The trained machine learning model used in the present disclosure may be updated from time to time, e.g., periodically or not, based on a sample set that is at least partially different from the original sample set from which the original trained machine learning model is determined. For instance, the trained machine learning model may be updated based on a sample set including new samples that are not in the original sample set. In some embodiments, the determination and/or updating of the trained machine learning model may be performed on a processing device, while the application of the trained machine learning model may be performed on a different processing device. In some embodiments, the determination and/or updating of the trained machine learning model may be performed on a processing device of a system different than the system 100 or a server different than a server including the processing device 122 on which the application of the trained machine learning model is performed. For instance, the determination and/or updating of the trained machine learning model may be performed on a first system of a vendor who provides and/or maintains such a machine learning model and/or has access to training samples used to determine and/or update the trained machine learning model, while audio signal generation based on the provided machine learning model may be performed on a second system of a client of the vendor. In some embodiments, the determination and/or updating of the trained machine learning model may be performed online in response to a request for audio signal generation. In some embodiments, the determination and/or updating of the trained machine learning model may be performed offline.

In some embodiments, the processing device 122 may include one or more processing engines (e.g., single-core processing engine(s) or multi-core processor(s)). Merely by way of example, the processing device 122 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof. In some embodiments, the processing device 122 may be integrated into the audio collection device 110.

In some embodiments, the terminal 130 may include a mobile device 130-1, a tablet computer 130-2, a laptop computer 130-3, a built-in device in a vehicle 130-4, a wearable device 130-5, or the like, or any combination thereof. In some embodiments, the mobile device 130-1 may include a smart home device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include Google™ Glasses, an Oculus Rift, a HoloLens, a Gear VR, etc. In some embodiments, the built-in device in the vehicle 130-4 may include an onboard computer, an onboard television, etc. In some embodiments, the terminal 130 may be a device with positioning technology for locating the position of the passenger and/or the terminal 130. In some embodiments, the wearable device 130-5 may include a smart bracelet, a smart footgear, smart glasses, a smart helmet, a smartwatch, smart clothing, a smart backpack, a smart accessory, or the like, or any combination thereof. In some embodiments, the audio collection device 110 and the terminal 130 may be integrated into one single device.

The storage device 140 may store data and/or instructions. For example, the storage device 140 may store data of a plurality of groups of speech samples, one or more machine learning models, a trained machine learning model and/or a constructed filter, audio data collected by the bone conduction microphone 112 and air conduction microphone 114, etc. In some embodiments, the storage device 140 may store data obtained from the terminal 130 and/or the audio collection device 110. In some embodiments, the storage device 140 may store data and/or instructions that the server 120 may execute or use to perform exemplary methods described in the present disclosure. In some embodiments, storage device 140 may include a mass storage, removable storage, a volatile read-and-write memory, a read-only memory (ROM), or the like, or any combination thereof. Exemplary mass storage may include a magnetic disk, an optical disk, solid-state drives, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 150 to communicate with one or more components of the audio signal generation system 100 (e.g., the audio collection device 110, the server 120, and the terminal 130). One or more components of the audio signal generation system 100 may access the data or instructions stored in the storage device 140 via the network 150. In some embodiments, the storage device 140 may be directly connected to or communicate with one or more components of the audio signal generation system 100 (e.g., the audio collection device 110, the server 120, and the terminal 130). In some embodiments, the storage device 140 may be part of the server 120.

The network 150 may facilitate the exchange of information and/or data. In some embodiments, one or more components (e.g., the audio collection device 110, the server 120, the terminal 130, and the storage device 140) of the audio signal generation system 100 may transmit information and/or data to other component(s) of the audio signal generation system 100 via the network 150. For example, the server 120 may obtain bone conduction data and air conduction data from the terminal 130 via the network 150. In some embodiments, the network 150 may be any type of wired or wireless network, or combination thereof. Merely by way of example, the network 150 may include a cable network, a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 150 may include one or more network access points. For example, the network 150 may include wired or wireless network access points such as base stations and/or internet exchange points, through which one or more components of the audio signal generation system 100 may be connected to the network 150 to exchange data and/or information.

One of ordinary skill in the art would understand that when an element (or component) of the audio signal generation system 100 performs, the element may perform through electrical signals and/or electromagnetic signals. For example, when a bone conduction microphone 112 transmits out bone conduction data to the server 120, a processor of the bone conduction microphone 112 may generate an electrical signal encoding the bone conduction data. The processor of the bone conduction microphone 112 may then transmit the electrical signal to an output port. If the bone conduction microphone 112 communicates with the server 120 via a wired network, the output port may be physically connected to a cable, which further may transmit the electrical signal to an input port of the server 120. If the bone conduction microphone 112 communicates with the server 120 via a wireless network, the output port of the bone conduction microphone 112 may be one or more antennas, which convert the electrical signal to electromagnetic signal. Similarly, an air conduction microphone 114 may transmit out air conduction data to the server 120 via electrical signal or electromagnet signals. Within an electronic device, such as the terminal 130 and/or the server 120, when a processor thereof processes an instruction, transmits out an instruction, and/or performs an action, the instruction and/or action is conducted via electrical signals. For example, when the processor retrieves or saves data from a storage medium, it may transmit out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
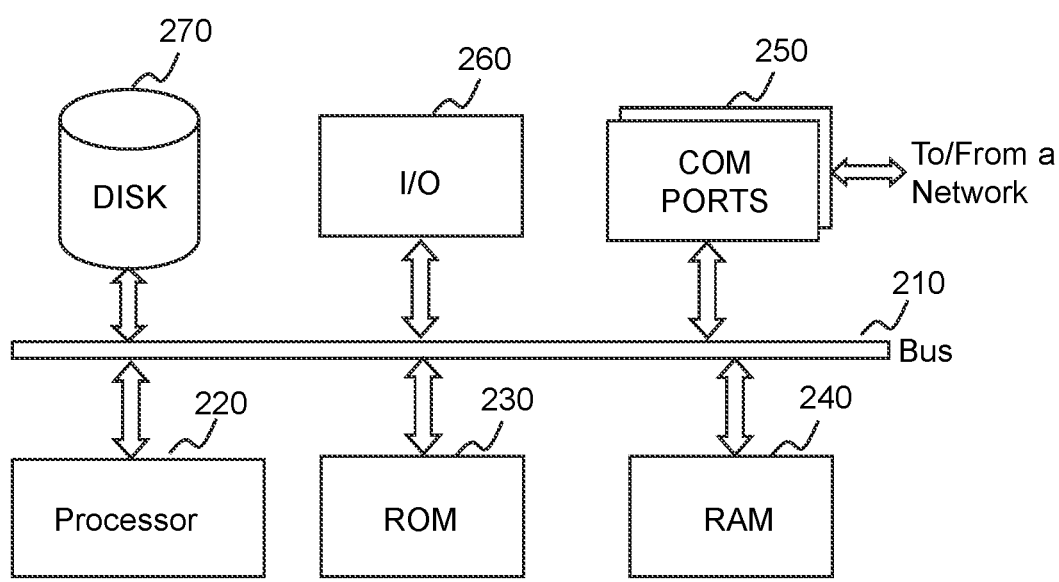
FIG. 2 is a schematic diagram illustrating exemplary hardware and software components of a computing device according to some embodiments of the present disclosure.

FIG. 2 illustrates a schematic diagram of an exemplary computing device according to some embodiments of the present disclosure. The computing device may be a computer, such as the processing device 122 in FIG. 1 and/or a computer with specific functions, configured to implement any particular system according to some embodiments of the present disclosure. Computing device 200 may be configured to implement any components that perform one or more functions disclosed in the present disclosure. For example, the server 120 may be implemented in hardware devices, software programs, firmware, or any combination thereof of a computer like computing device 200. For brevity, FIG. 2 depicts only one computing device. In some embodiments, the functions of the computing device may be implemented by a group of similar platforms in a distributed mode to disperse the processing load of the system.

The computing device 200 may include communication ports 250 that may connect with a network that may implement data communication. The computing device 200 may also include a processor 220 that is configured to execute instructions and includes one or more processors. The schematic computer platform may include an internal communication bus 210, different types of program storage units and data storage units (e.g., a hard disk 270, a read-only memory (ROM) 230, a random-access memory (RAM) 240), various data files applicable to computer processing and/or communication, and some program instructions executed possibly by the processor 220. The computing device 200 may also include an I/O device 260 that may support the input and output of data flows between computing device 200 and other components. Moreover, the computing device 200 may receive programs and data via the communication network.

Figure 3:
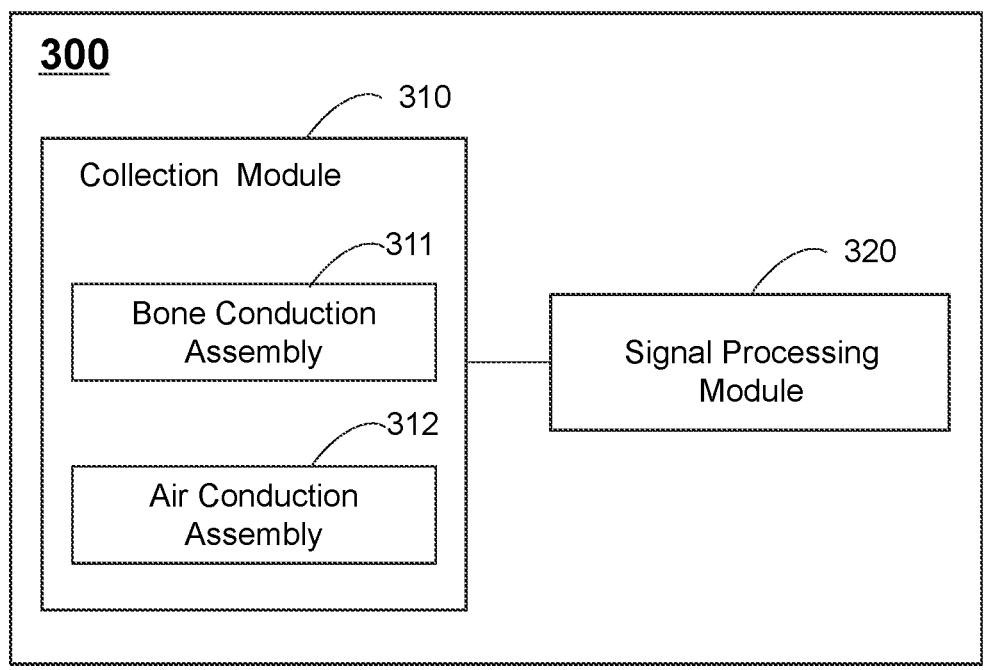
FIG. 3 is a schematic diagram of an exemplary acoustic collection device according to some embodiments of the present disclosure.

FIG. 3 is a schematic diagram of an exemplary acoustic collection device according to some embodiments of the present disclosure. As shown in FIG. 3, the acoustic collection device 300 may include a collection module 310 and a signal processing module 320.

The collection module 310 may be configured to collect vibration signals generated when a user speaks and convert the vibrations signals into electrical signals (also referred to as audio signals). The vibration signals may represent a speech of the user. Specifically, the vibration signals generated when the user speaks may be transmitted to one or more assemblies of the collection module 310 (e.g., a diaphragm of a microphone assembly) in the form of mechanical vibrations, and cause the one or more assemblies of the collection module 310 to generate corresponding mechanical vibrations.

For illustration purposes, the collection module 310 may include a bone conduction assembly 311 and/or an air conduction assembly 312. The bone conduction assembly 311 may include a vibration component, a magnet component, and a coil. The vibration component may collect vibration signals (also referred to as bone conduction vibration signals or acoustic waves) conducted through the bone (e.g., the skull) of a user generated when the user speaks as described elsewhere in the present disclosure (e.g., FIG. 1 and the descriptions thereof). The bone conduction assembly 311 may convert vibration signals into electrical signals (i.e., audio signals). For example, the vibration of the vibration plate may cause the vibration of the coil. The coil may vibrate in a magnetic field generated by the magnet component to generate the electric signals.

The air conduction assembly 312 may collect vibration signals (also referred to as air conduction vibration signals) conducted through the air when a user speaks as described elsewhere in the present disclosure (e.g., FIG. 1 and the descriptions thereof). The air conduction assembly 312 may include a vibration component, a magnet component, and a coil. The vibration component may collect vibration signals (also referred to as bone conduction vibration signals or acoustic waves) conducted through the air when the user speaks as described elsewhere in the present disclosure (e.g., FIG. 1 and the descriptions thereof). The air conduction assembly 312 may convert vibration signals into electrical signals (i.e., audio signals). For example, the vibration of the vibration plate may cause the vibration of the coil. The coil may vibrate in a magnetic field generated by the magnet component to generate the electric signals.

In some embodiments, the bone conduction assembly 311 and the air conduction assembly 312 may be two independent functional devices or two independent components of a single device. As used herein, that a first device is independent of a second device represents that the operation of the first/second device is not caused by the operation of the second/first device, or in other words, the operation of the first/second device is not a result of the operation of the second/first device. Taking the bone conduction assembly and the air conduction assembly as examples, the air conduction assembly is independent of the bone conduction assembly because the air conduction assembly is driven to generate the air conduction vibration signals by the vibration of the air when a user speaks, and the bone conduction assembly is driven to generate the bone conduction vibration signals by the vibration of the bone when the user speaks.

In some embodiments, a bone conduction audio signal or an air conduction audio signal may be represented by a superposition of multiple waves (e.g., sine waves, harmonic waves, etc.) with different frequencies and/or intensities (i.e., amplitudes). As used herein, a wave with a specific frequency may also be referred to as a frequency component with the specific frequency. In some embodiments, the frequency components included in the bone conduction audio signal acquired by the bone conduction assembly 321 may be in a frequency range from 0 Hz to 20 kHz, or from 20 Hz to 10 kHz, or from 20 Hz to 4000 Hz, or from 20 Hz to 3000 Hz, or from 1000 Hz to 3500 Hz, or from 1000 Hz to 3000 Hz, or from 1500 Hz to 3000 Hz, etc. In some embodiments, the frequency components included in the air conduction audio signal collected by the air conduction assembly 322 may be in a frequency range from 0 Hz to 20 kHz, or from 20 Hz to 20 kHz, or from 1000 Hz to 10 kHz, etc.

The signal processing module 320 may be electrically coupled to the bone conduction assembly 311 and/or the air conduction assembly 312. The signal processing module 320 may receive the vibration signals (i.e., audio signals) from the collection module 310 and process the vibration signals (i.e., audio signals). For example, the signal processing module 320 may process the bone conduction audio signal and the air conduction audio signal according to process 600, 700, and/or 1000.

As another example, the signal processing module 320 may process the audio signals by performing various signal processing operations, such as sampling, digitalization, compression, frequency division, frequency modulation, encoding, or the like, or a combination thereof.

In some embodiments, the signal processing module 320 may include a processor that is the same as or different from the processing device 122.

It should be noted that the above description regarding the audio collection device 300 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the audio collection device 300 may include an output module configured to transmit a processed audio signal (e.g., a target audio signal as described elsewhere in the present disclosure) to an output device (e.g., a terminal with a speaker (e.g., a bone conduction speaker and/or an air conduction speaker). As another example, the output module may include a speaker (e.g., a bone conduction speaker and/or an air conduction speaker) configured to output the processed audio signal.

Figure 4:
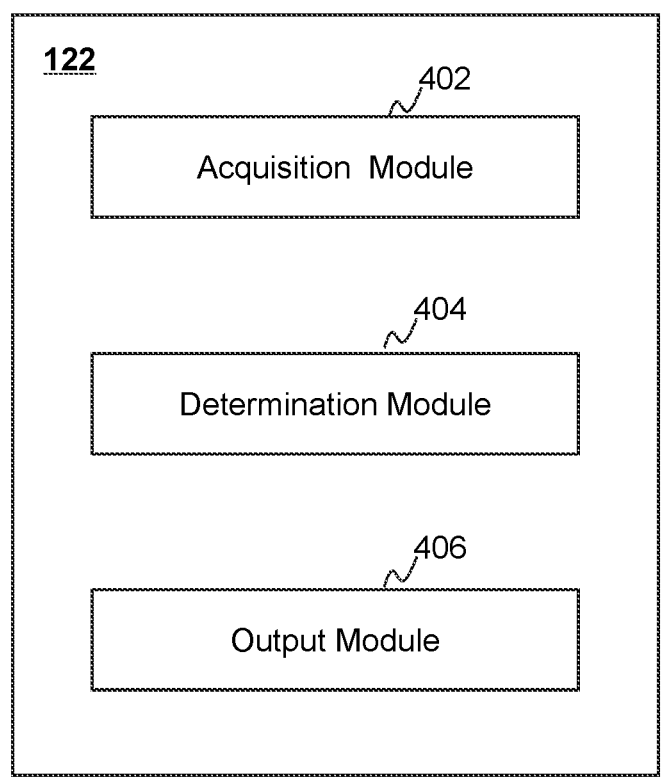
FIG. 4 is a block diagram illustrating an exemplary processing device according to some embodiments of the present disclosure.

FIG. 4 is a block diagram illustrating exemplary processing devices 122 according to some embodiments of the present disclosure. The processing device 122 may be an exemplary processing device 122 as described in connection with FIG. 1. In some embodiments, the processing device 122 may be configured to apply one or more machine learning models in generating an audio signal.

As shown in FIG. 4, the processing device 122 may include an acquisition module 402, a determination module 404, and an output module 406.

The acquisition module 402 may be configured to obtain information relating to the audio signal generation system 100. For example, the acquisition module 402 may obtain a bone conduction audio signal acquired by a bone conduction sensor and an air conduction audio signal acquired by an air conduction sensor. More descriptions regarding the obtaining of the bone conduction audio signal and the air conduction audio signal may be found elsewhere in the present disclosure. See, e.g., operations 602 and 604 in FIG. 6 and relevant descriptions thereof. As another example, the acquisition module 402 may obtain a trained machine learning model. The trained machine learning model may provide a mapping relationship between a set of bone conduction data derived from a specific bone conduction audio signal and one or more sets of equivalent air conduction data derived from a specific equivalent air conduction signal corresponding to the specific bone conduction audio signal. More descriptions regarding the trained machine learning model may be found elsewhere in the present disclosure. See, e.g., operation 606 in FIG. 6 and relevant descriptions thereof.

The determination module 404 may be configured to determine a target set of equivalent air conduction data corresponding to the bone conduction audio signal using the trained machine learning model based on the bone conduction audio signal and the air conduction audio signal. More descriptions regarding the determination of the target set of equivalent air conduction data may be found elsewhere in the present disclosure. See, e.g., operation 608 in FIG. 6 and relevant descriptions thereof.

The determination module 404 may be also configured to generate a target audio signal representing the speech of the user using the trained first machine learning model based on the bone conduction audio signal and the air conduction audio signal. More descriptions regarding the generation of the target audio signal may be found elsewhere in the present disclosure. See, e.g., operation 1008 in FIG. 10 and relevant descriptions thereof.

The output module 406 may be configured to cause an audio signal output device to output the target audio signal. More descriptions regarding the output of the target audio signal may be found elsewhere in the present disclosure. See, e.g., operation 610 in FIG. 6, operation 1010 in FIG. 10 and relevant descriptions thereof.

Figure 5:
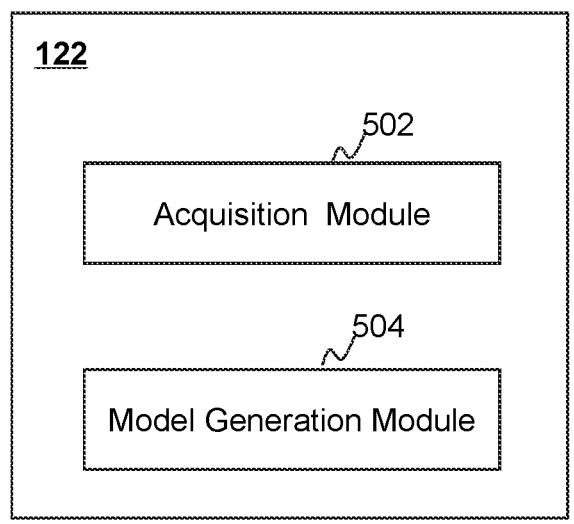
FIG. 5 is a block diagram illustrating another exemplary processing device according to some embodiments of the present disclosure.

FIG. 5 is a block diagram illustrating an exemplary processing device 122 according to some embodiments of the present disclosure. The processing device 122 may be an exemplary processing device 122 as described in connection with FIG. 1. In some embodiments, the processing device 122 may be configured to generate one or more machine learning models. In some embodiments, the processing device 122 as described in FIG. 4 and the processing device 122 as described in FIG. 5 may be respectively implemented on a processing unit. Alternatively, the processing device 122 as described in FIG. 4 and/or the processing device 122 as described in FIG. 5 may be implemented on a same computing device (e.g., the computing device 200).

As shown in FIG. 5, the processing device 122 may include an acquisition module 502 and a model generation module 504.

The acquisition module 502 may be configured to obtain a plurality of groups of training data. In some embodiments, each group of the plurality of groups of training data may include a first audio signal and a second audio signal that represent the same speech sample. In some embodiments, each group of the plurality of groups of training data may include a bone conduction audio signal, an air conduction audio signal, and a reference air conduction audio signal. In the training of the preliminary machine learning model, the bone conduction audio signal and the air conduction audio signal in each group of training data may serve as an input of the preliminary machine learning model, and the reference air conduction audio signal may serve as a desired output of the preliminary machine learning model. More descriptions regarding the acquisition of the training data may be found elsewhere in the present disclosure. See, e.g., operation 802 in FIG. 8, operation 1006 in FIG. 10, and relevant descriptions thereof.

The model generation module 504 may be configured to generate the one or more trained machine learning models by training a preliminary machine learning model using the plurality of groups of training data. In some embodiments, the one or more machine learning models may be generated according to a machine learning algorithm. The machine learning algorithm may include but not be limited to an artificial neural network algorithm, a deep learning algorithm, a decision tree algorithm, an association rule algorithm, an inductive logic programming algorithm, a support vector machine algorithm, a clustering algorithm, a Bayesian network algorithm, a reinforcement learning algorithm, a representation learning algorithm, a similarity and metric learning algorithm, a sparse dictionary learning algorithm, a genetic algorithm, a rule-based machine learning algorithm, or the like, or any combination thereof. The machine learning algorithm used to generate the one or more machine learning models may be a supervised learning algorithm, a semi-supervised learning algorithm, an unsupervised learning algorithm, or the like. More descriptions regarding the generation of the one or more machine learning models may be found elsewhere in the present disclosure. See, e.g., operation 804 in FIG. 8, operation 1006 in FIG. 10, and relevant descriptions thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the processing device 122 as described in FIG. 4 and/or the processing device 122 as described in FIG. 5 may share two or more of the modules, and any one of the modules may be divided into two or more units. For instance, the processing device 122 as described in FIG. 4 and the processing device 122 as described in FIG. 5 may share a same acquisition module; that is, the acquisition module 402 and the acquisition module 502 are a same module. In some embodiments, the processing device 122 as described in FIG. 4 and/or the processing device 122 as described in FIG. 5 may include one or more additional modules, such as a storage module (not shown) for storing data. In some embodiments, the processing device 122 as described in FIG. 4 and the processing device 122 as described in FIG. 5 may be integrated into one processing device 122.

Figure 6:
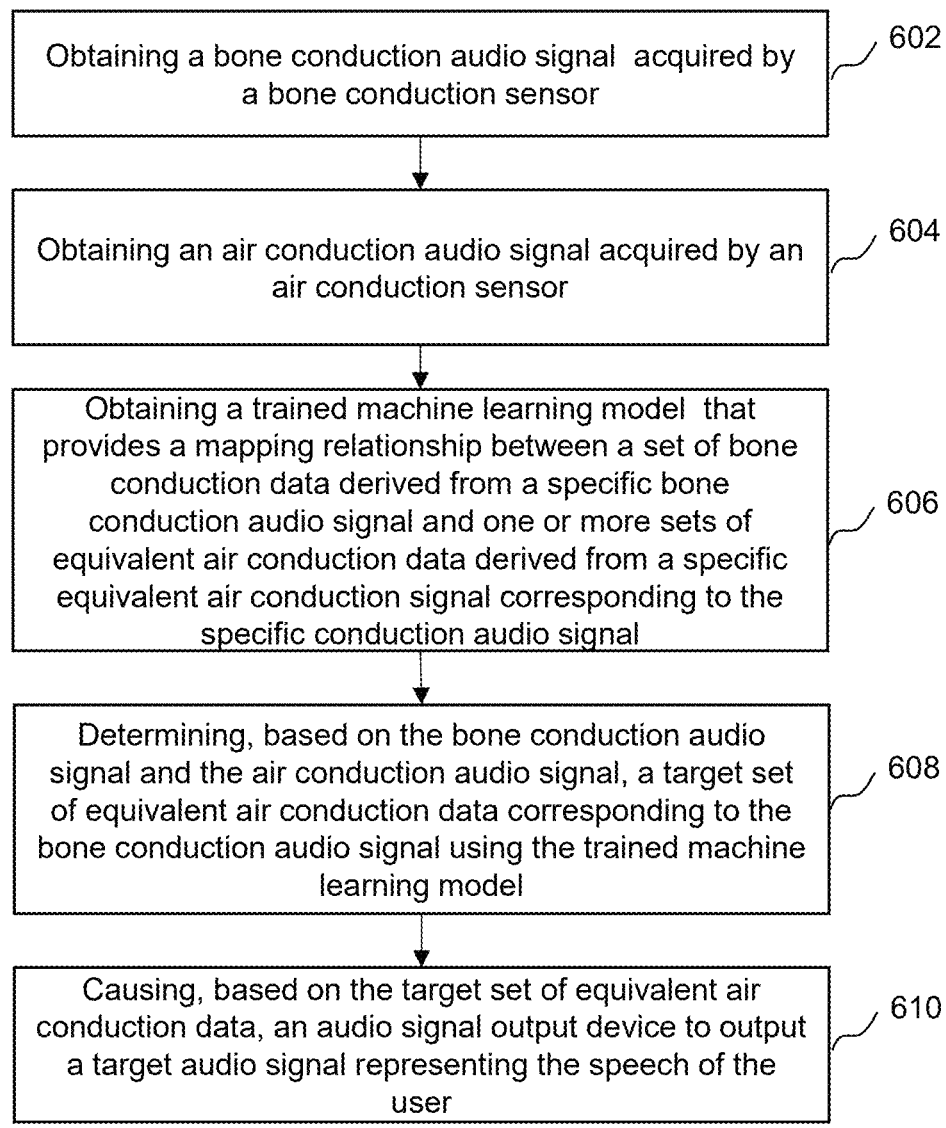
FIG. 6 is a schematic flowchart illustrating an exemplary process for generating an audio signal according to some embodiments of the present disclosure.

FIG. 6 is a schematic flowchart illustrating an exemplary process for generating an audio signal according to some embodiments of the present disclosure. In some embodiments, a process 600 may be implemented as a set of instructions (e.g., an application) stored in the storage device 140, ROM 230 or RAM 240, or storage 390. The processing device 122, the processor 220, and/or the CPU 340 may execute the set of instructions, and when executing the instructions, the processing device 122, the processor 220, and/or the CPU 340 may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process 600 illustrated in FIG. 6 and described below is not intended to be limiting.

In 602, the processing device 122 (e.g., the acquisition module 402) may obtain a bone conduction audio signal acquired by a bone conduction sensor.

As used herein, the bone conduction sensor may refer to any sensor (e.g., the bone conduction microphone 112) that may acquire vibration signals conducted through the bone (e.g., the skull) of a user generated when the user speaks as described elsewhere in the present disclosure (e.g., FIG. 1 and the descriptions thereof). The vibration signals acquired by the bone conduction sensor may be converted into audio signals (also referred to as audio data) by the bone conduction sensor or any other device (e.g., an amplifier, an analog-to-digital converter (ADC), etc.). The audio signals acquired by the bone conduction sensor may be also referred to as bone conduction audio signals. An audio signal refers to data that includes a semantic content of a speech.

In some embodiments, the processing device 122 may obtain the bone conduction audio signal from the bone conduction sensor (e.g., the bone conduction microphone 112), the terminal 130, the storage device 140, or any other storage device via the network 150 in real-time or periodically. For example, the bone conduction audio signal may be acquired and/or generated by the bone conduction sensor when a user speaks in a time period less than a threshold (e.g., 20 ms, 30 ms, 40 ms, etc.). The bone conduction sensor may transmit the bone conduction audio signal to the processing device 122 directly in real-time. As used herein, the bone conduction sensor transmitting the bone conduction audio signal to the processing device 122 in real-time refers to that an acquisition time of the bone conduction audio signal acquired by the bone conduction sensor and a receiving time of the bone conduction audio signal obtained by the processing device 122 is less than a threshold (e.g., 20 ms, 20 ms, 30 ms, 40 ms, etc.). As another example, the bone conduction sensor may transmit the bone conduction audio signal periodically, for example, every second, every minute, every hour, etc.

The bone conduction audio signal may be represented by a superposition of multiple waves (e.g., sine waves, harmonic waves, etc.) with different frequencies and/or intensities (i.e., amplitudes). As used herein, a wave with a specific frequency may also be referred to as a frequency component with the specific frequency. In some embodiments, the frequency components included in the bone conduction audio signal collected by the bone conduction sensor may be in a frequency range from 0 Hz to 20 kHz, or from 20 Hz to 10 kHz, or from 20 Hz to 4000 Hz, or from 20 Hz to 3000 Hz, or from 1000 Hz to 3500 Hz, or from 1000 Hz to 3000 Hz, or from 1500 Hz to 3000 Hz, etc.

In some embodiments, the bone conduction audio signal may be collected and/or generated by positioning the bone conduction sensor at a region of the user's body and/or putting the bone conduction sensor in contact with the skin of the user. The regions of the user's body in contact with the bone conduction sensor for collecting the bone conduction audio signal may include but not limited to the forehead, the neck (e.g., the throat), a mastoid, an area around an ear or inside of the ear, a temple, the face (e.g., an area around the mouth, the chin), the top of the head, etc. For example, the bone conduction microphone 112 may be positioned at and/or in contact with the ear screen, the auricle, the inner auditory meatus, the external auditory meatus, etc. In some embodiments, the bone conduction audio signal may be different according to different regions of the user's body in contact with the bone conduction sensor. For example, different regions of the user's body in contact with the bone conduction sensor may cause the frequency components, acoustic characteristics of the bone conduction audio signal (e.g., an amplitude of a frequency component), noises included in the bone conduction audio signal, etc., to vary. For example, the signal intensity of the bone conduction audio signal collected by a bone conduction sensor located at the neck is greater than the signal intensity of the bone conduction audio signal collected by a bone conduction sensor located at the tragus, and the signal intensity of the bone conduction audio signal collected by the bone conduction sensor located at the tragus is greater than the signal intensity of the bone conduction audio signal collected by a bone conduction sensor located at the auditory meatus. As a further example, the bone conduction audio signal collected by a first bone conduction sensor positioned at a region around an ear of a user may include more frequency components than the bone conduction audio signal collected simultaneously by a second bone conduction audio sensor with the same configuration but positioned at the top of the head of the user. In some embodiments, the bone conduction audio signal may be collected by the bone conduction sensor located at a region of the user's body with a specific pressure applied by the bone conduction sensor in a range, such as 0 Newton to 1 Newton, or 0 Newton to 0.8 Newton, etc. For example, the bone conduction audio signal may be collected by the bone conduction sensor located at a tragus of the user's body with a specific pressure 0 Newton, or 0.2 Newton, or 0.4 Newton, or 0.8 Newton, etc., applied by the bone conduction sensor. Different pressures on the same region of the user's body exerted by the bone conduction sensor may cause the frequency components, acoustic characteristics of the bone conduction audio signal (e.g., an amplitude of a frequency component), noises included in the bone conduction audio signal, etc., to vary. For example, the signal intensity of the bone conduction data may increase gradually at first, and then the increase of the signal intensity may slow down to saturation when the pressure increases from 0N to 0.8N.

The bone conduction audio signal may represent what the user speaks, i.e., the speech of the user. In other words, the bone conduction audio signal may include acoustic characteristics and/or semantic information that may reflect or indicate the semantic content of the speech of the user. As used herein, the semantic information represented in an audio signal (e.g., the bone conduction audio signal) may refer to semantic contents identified from the audio data using a speech recognition technique. The semantic information identified from an audio signal (e.g., the bone conduction audio signal) using a speech recognition technique may also be referred to as an estimated semantic content. The semantic content of the speech of the user may also be referred to as an actual semantic content. The estimated semantic content identified from the audio signal (e.g., the bone conduction audio signal) may be the same as or similar to the actual semantic content of the speech of the user. As used herein, the semantic information represented in an audio signal (i.e., the estimated semantic content) reflecting or indicating the actual semantic content of the speech of the user refers to that a similarity or correlation degree between the estimated semantic content identified from the audio signal (e.g., the bone conduction audio signal) and the actual semantic content of the speech of the user is greater than a threshold (e.g., 90%, 95%, 99%, etc.).

The acoustic characteristics of the bone conduction audio signal may include one or more features associated with duration, one or more features associated with energy, one or more features associated with fundamental frequency, one or more features associated with frequency spectrum, one or more features associated with phase spectrum, etc. A feature associated with duration may also be referred to as a duration feature. Exemplary duration features may include a speaking speed, a short time average zero-over rate, etc. A feature associated with energy may also be referred to as an energy or amplitude feature. Exemplary energy or amplitude features may include a short time average energy, a short time average amplitude, a short time energy gradient, an average amplitude change rate, a short time maximum amplitude, etc. A feature associated with fundamental frequency may be also referred to as a fundamental frequency feature. Exemplary fundamental frequency features may include a fundamental frequency, a pitch of the fundamental frequency, an average fundamental frequency, a maximum fundamental frequency, a fundamental frequency range, etc. Exemplary features associated with frequency spectrum may include formant features, linear prediction cepstrum coefficients (LPCC), mel-frequency cepstrum coefficients (MFCC), etc. Exemplary features associated with phase spectrum may include an instantaneous phase, an initial phase, etc.

In some embodiments, the bone conduction audio signal may be an audio signal in a time domain, an audio signal in a frequency domain, etc. The bone conduction audio signal may include an analog signal or a digital signal.

In some embodiments, the bone conduction audio signal may be processed to obtain one or more sets of bone conduction data. In some embodiments, the bone conduction audio signal may be divided into one or more portions each of which corresponds to a time period. For example, a framing operation may be performed on the bone conduction audio signal according to a time window. A set of bone conduction data may include an audio frame. In some embodiments, a feature extraction operation may be performed on the bone conduction audio signal to obtain the one or more sets of bone conduction data and/or an audio recognition operation may be performed based on the extracted acoustic characteristics to obtain the one or more sets of bone conduction data. The set of bone conduction data may include bone conduction acoustic characteristics that can form a phoneme, a phoneme that is composed of bone conduction acoustic characteristics, a syllable that is composed of one or more phonemes, a word that is composed of one or more syllables, a phrase that is composed of one or more words, a sentence that is composed of one or more phrases, or the like, or any combination thereof.

In 604, the processing device 122 (e.g., the acquisition module 402) may obtain an air conduction audio signal acquired by an air conduction sensor.

The air conduction sensor used herein may refer to any sensor (e.g., the air conduction microphone 114) that may acquire vibration signals conducted through the air when a user speaks as described elsewhere in the present disclosure (e.g., FIG. 1 and the descriptions thereof). The vibration signals acquired by the air conduction sensor may be converted into audio signals (also referred to as audio data) by the air conduction sensor or any other device (e.g., an amplifier, an analog-to-digital converter (ADC), etc.). The audio signals acquired by the air conduction sensor may be also referred to as air conduction audio signals.

In some embodiments, the processing device 122 may obtain the air conduction audio signal from the air conduction sensor (e.g., the air conduction microphone 114), the terminal 130, the storage device 140, or any other storage device via the network 150 in real time or periodically. The air conduction audio signal may be acquired and/or generated by the air conduction sensor when a user speaks. In some embodiments, the air conduction audio signal may be collected by positioning the air conduction sensor within a distance threshold (e.g., 0 cm, 1 cm, 2 cm, 5 cm, 10 cm, 20 cm, etc.) from the mouth of the user. In some embodiments, the air conduction audio signal (e.g., an average amplitude of the air conduction audio signal) may be different according to different distances between the air conduction sensor and the mouth of the user.

In some embodiments, the air conduction audio signal may be an audio signal in a time domain, an audio signal in a frequency domain, etc. The air conduction audio signal may include an analog signal or a digital signal.

The air conduction audio signal may be represented by a superposition of multiple waves (e.g., sine waves, harmonic waves, etc.) with different frequencies and/or intensities (i.e., amplitudes). In some embodiments, the frequency components included in the air conduction audio signal collected by the air conduction sensor may be in a frequency range from 0 Hz to 20 kHz, or from 20 Hz to 20 kHz, or from 1000 Hz to 10 kHz, etc. The air conduction audio signal may be collected and/or generated by the air conduction data when a user speaks. The air conduction audio signal may represent what the user speaks, i.e., the speech of the user. For example, the air conduction audio signal may include acoustic characteristics and/or semantic information that may reflect the semantic content of the speech of the user. The acoustic characteristics of the air conduction audio signal may include one or more features associated with duration, one or more features associated with energy, one or more features associated with fundamental frequency, one or more features associated with frequency spectrum, one or more features associated with phase spectrum, etc., as described in operation 602.

In some embodiments, the bone conduction audio signal and the air conduction audio signal may represent the same speech of a user with differing frequency components. The bone conduction data and the air conduction data may include the same or different estimated semantic information that may reflect the actual semantic content of the same speech of the user. The estimated semantic information identified from the air conduction audio signal may be the same as or different from the estimated semantic information identified from the bone conduction audio signal. The bone conduction audio signal and the air conduction audio signal representing the same speech of the user may refer to that the bone conduction audio signal and the air conduction audio signal are simultaneously collected by the bone conduction sensor and the air conduction sensor, respectively when the user makes the speech. In some embodiments, the bone conduction audio signal collected by the bone conduction sensor may include first frequency components. The air conduction audio signal may include second frequency components. In some embodiments, the second frequency components of the air conduction audio signal may include at least a portion of the first frequency components. An acoustic characteristic of the air conduction audio signal may be the same as or different from the acoustic characteristic of the bone conduction audio signal. For example, an amplitude of a specific frequency component of the bone conduction audio signal may be different from an amplitude of the specific frequency component of the air conduction audio signal. As another example, frequency components of the bone conduction audio signal less than a frequency point (e.g., 2000 Hz) or in a frequency range (e.g., 20 Hz to 2000 Hz) may be more than frequency components of the air conduction audio signal less than the frequency point (e.g., 2000 Hz) or in the frequency range (e.g., 20 Hz to 2000 Hz). Frequency components of the bone conduction audio signal greater than a frequency point (e.g., 3000 Hz) or in a frequency range (e.g., 3000 Hz to 20 kHz) may be less than frequency components of the air conduction audio signal greater than the frequency point (e.g., 3000 Hz) or in a frequency range (e.g., 3000 Hz to 20 kHz). As used herein, frequency components of the bone conduction audio signal less than a frequency point (e.g., 2000 Hz) or in a frequency range (e.g., 20 Hz to 2000 Hz) more than frequency components of the air conduction audio signal less than the frequency point (e.g., 2000 Hz) or in the frequency range (e.g., 20 Hz to 2000 Hz) may refer to that a count or number of the frequency components of the bone conduction audio signal less than a frequency point (e.g., 2000 Hz) or in a frequency range (e.g., 20 Hz to 2000 Hz) are greater than the count or number of frequency components of the air conduction audio signal less than the frequency point (e.g., 2000 Hz) or in the frequency range (e.g., 20 Hz to 2000 Hz).

In some embodiments, the air conduction audio signal may be processed to obtain one or more sets of air conduction data as similar to or same as the one or more sets of bone conduction data. The sets of air conduction data may represent what the user speaks, i.e., a speech of a user. A set of air conduction data may include air conduction acoustic characteristics that can for a phoneme, one or more phonemes that are composed of the air conduction acoustic characteristics, one or more syllables that are composed of one or more phonemes, one or more words that are composed of one or more syllables, one or more phrases that are composed of one or more words, one or more sentences that are composed of one or more phrases, or the like, or any combination thereof.

In some embodiments, the processing device 122 may preprocess at least one of the bone conduction audio signal or the air conduction audio signal. Exemplary preprocessing operations may include a domain transform operation, a signal calibration operation, a speech enhancement operation, etc.

In 606, the processing device 122 (e.g., the acquisition module 402) may obtain a trained machine learning model that provides a mapping relationship between a set of bone conduction data derived from a specific bone conduction audio signal and one or more sets of equivalent air conduction data derived from a specific equivalent air conduction signal corresponding to the specific bone conduction audio signal.

As used herein, the specific bone conduction audio signal refers to an audio signal (e.g., the bone conduction audio signal obtained in operation 602) acquired by a bone conduction sensor (e.g., the bone conduction sensor as described in operation 602) when a specific user makes a speech. The specific equivalent air conduction signal corresponding to the specific bone conduction audio signal refers to an audio signal that may be generated by an air conduction sensor (e.g., the air conduction sensor as described in operation 604) if the speech of the specific user is acquired by the air conduction sensor under a noiseless condition when the speech of the specific user is acquired by the bone conduction sensor. The specific bone conduction audio signal may represent the same speech of the specific user as the specific equivalent air conduction audio signal. The noiseless condition may refer to that one or more noise evaluation parameters (e.g., the noise standard curve, a statistical noise level, etc.) satisfy a condition, such as less than a threshold. The semantic information represented by the set of bone conduction data derived from the specific bone conduction audio signal may be similar to or the same as the semantic information represented by each of the one or more sets of the equivalent air conduction data derived from the specific equivalent air conduction audio signal. A similarity or a correlation degree between the semantic information represented by the set of bone conduction data and the semantic information represented by each of the one or more sets of the equivalent air conduction data may exceed a threshold, such as 90%, 95%, 99%, etc.

In some embodiments, the mapping relationship between the set of bone conduction data and the one or more sets of equivalent air conduction data may indicate a matching relationship between the set of bone conduction data and each of the one or more sets of equivalent air conduction data. As used herein, the matching relationship between the set of bone conduction data and each of the one or more sets of equivalent air conduction data may refer to that the set of bone conduction data matches each of the one or more sets of equivalent air conduction data. The set of bone conduction data may match the set of equivalent air conduction data if a similarity or a correlation degree between the semantic information represented by the set of bone conduction data and the semantic information represented by the set of the equivalent air conduction data exceeds a threshold, such as 90%, 95%, 99%, etc.

In some embodiments, the set of bone conduction data derived from the specific bone conduction signal may include a set of acoustic characteristics extracted from the specific bone conduction signal, a phoneme composed by one or more sets of acoustic characteristics, a syllable composed by one or more phonemes, a word composed by one or more syllables, etc. In some embodiments, the set of equivalent air conduction data derived from the specific equivalent air conduction signal may include a set of acoustic characteristics extracted from the specific equivalent air conduction signal, a phoneme composed by one or more sets of acoustic characteristics, a syllable composed by one or more phonemes, a word composed by one or more syllables, etc.

In some embodiments, the mapping relationship between the set of bone conduction data and the one or more sets of equivalent air conduction data may include a mapping relationship between acoustic characteristics, a mapping relationship between phonemes, a mapping relationship between syllables, a mapping relationship between words, or the like, or any combination thereof. The mapping relationship between acoustic characteristics refers to a matching relationship between a set of acoustic characteristics in the specific bone conduction audio signal with each of one or more sets of acoustic characteristics in the specific equivalent air conduction audio signal. The mapping relationship between phonemes refers to a matching relationship between each phoneme in the specific bone conduction audio signal with each of one or more phonemes in the specific equivalent air conduction audio signal. The mapping relationship between syllables refers to a matching relationship between each syllable in the specific bone conduction audio signal with each of one or more syllables in the specific equivalent air conduction audio signal. The mapping relationship between words refers to a matching relationship between each word in the specific bone conduction audio signal with each of one or more words in the specific equivalent air conduction audio signal.

In some embodiments, the mapping relationship between the set of bone conduction data and the one or more sets of equivalent air conduction data may include one or more matching probabilities that the set of bone conduction data matches the one or more sets of equivalent air conduction data, respectively. A matching probability that the set of bone conduction data matches a set of equivalent air conduction data may indicate a similarity or correlation degree between the semantic information represented by the set of bone conduction data and the semantic information represented by the set of equivalent air conduction data. The greater the similarity or correlation degree between the semantic information represented by the set of bone conduction data and the semantic information represented by the set of equivalent air conduction data is, the greater the matching probability that the set of bone conduction data matches the set of equivalent air conduction data may be. In some embodiments, the similarity or correlation degree between the semantic information represented by the set of bone conduction data and the semantic information represented by the set of equivalent air conduction data may be equal to or designated as the matching probability that the set of bone conduction data matches the set of equivalent air conduction data.

Merely by way of example, the mapping relationship between syllables may include one or more matching probabilities that each syllable in the specific bone conduction audio signal matches one or more syllables in the specific equivalent air conduction audio signal, respectively.

In some embodiments, the trained machine learning model may be configured to determine the one or more sets of equivalent air conduction data and/or information (e.g., the one or more matching probabilities) relating to the one or more sets of equivalent air conduction data. In some embodiments, the trained machine learning model may be configured to perform a speech recognition operation on a bone conduction audio signal and/or an air conduction audio signal as described elsewhere in the present disclosure to identify one or more sets of bone conduction data (e.g., a set of acoustic characteristics, one or more phonemes, one or more syllables, one or more words, a sentence, etc.). In some embodiments, the trained machine learning model may be configured to determine the one or more sets of equivalent air conduction data and/or information (e.g., the one or more matching probabilities) relating to the one or more sets of equivalent air conduction data based on the set of identified bone conduction data. More descriptions for the trained machine learning model may be found elsewhere in the present disclosure (e.g., FIG. 7 and the descriptions thereof).

In some embodiments, the trained machine learning model may be reconstructed based on a neural network model. Exemplary neural network models may include a convolutional neural network (CNN) model, a recurrent neural network (RNN) model, a long short-term memory network (LSTM) model, etc. In some embodiments, the trained machine learning model may include a speech recognition model. Exemplary speech recognition models may include a hidden Markov model (HMM), a dynamic time warping (DTW)-based speech recognition model, an artificial neural network model, an end-to-end automatic speech recognition model, or the like, or any combination thereof.

In some embodiments, the processing device 122 may obtain the trained machine learning model from one or more components of the audio signal generation system 100 (e.g., the storage device 140, the terminals(s) 130) or an external source via a network (e.g., the network 150). For example, the trained machine learning model may be previously trained by a computing device (e.g., the processing device 122), and stored in a storage device (e.g., the storage device 140) of the audio signal generation system 100. The processing device 122 may access the storage device and retrieve the trained machine learning model. In some embodiments, the trained machine learning model may be generated according to a machine learning algorithm as described elsewhere in this disclosure (e.g., FIG. 4 and the relevant descriptions). More descriptions for the generation of the trained machine learning model may be found elsewhere in the present disclosure (e.g., FIG. 8 and the descriptions thereof).

In some embodiments, the processing device 122 may obtain the trained machine learning model based on a region of the user's body where the bone conduction sensor is positioned and/or a specific pressure applied by the bone conduction sensor when the bone conduction sensor acquires the bone conduction audio signal as described in operation 602. The regions of the user's body in contact with the bone conduction sensor for acquiring the bone conduction audio signal may include but not limited to the forehead, the neck (e.g., the throat), a mastoid, an area around an ear or inside of the ear, a temple, the face (e.g., an area around the mouth, the chin), the top of the head, etc. For example, multiple trained machine learning models corresponding to different regions and/or different pressures applied on a user by the bone conduction sensor may be stored in a database, and the processing device 122 may obtain the trained machine learning model corresponding to the same region as the region of the user's body where the bone conduction sensor is positioned when the bone conduction sensor acquires the bone conduction audio signal as described in operation 602.

In 608, the processing device 122 (e.g., the determination module 404) may determine, based on the bone conduction audio signal and the air conduction audio signal, a target set of equivalent air conduction data corresponding to the bone conduction audio signal using the trained machine learning model.

The target set of equivalent air conduction data corresponding to the bone conduction audio signal may represent a semantic content. The semantic content represented by the target set of equivalent air conduction data may indicate the actual semantic content of the speech of the user.

In some embodiments, the target set of equivalent air conduction data may include air conduction acoustic characteristics that may be extracted from the equivalent air conduction audio signal, one or more phonemes that are composed of the air conduction acoustic characteristics that may be extracted from the equivalent air conduction audio signal, one or more syllables that are composed of the one or more phonemes, one or more words that are composed of one or more syllables, one or more phrases that are composed of one or more words, one or more sentences that are composed of one or more phrases, or the like, or any combination thereof. The target set of equivalent air conduction data, the bone conduction audio signal obtained in operation 601, and the air conduction audio signal obtained in operation 602 may represent the same speech of the user.

In some embodiments, the bone conduction audio signal may include one or more sets of bone conduction data as described in operation 602. In some embodiments, for each of the one or more sets of bone conduction data, the processing device 122 may determine a target set of equivalent air conduction data corresponding to the set of bone conduction data. The target sets of equivalent air conduction data corresponding to the one or more sets of bone conduction data may form the target set of equivalent air conduction data corresponding to the bone conduction audio signal.

In some embodiments, for each of the one or more sets of bone conduction data, the processing device 122 may determine the one or more sets of equivalent air conduction data corresponding to the set of bone conduction data using the trained machine learning model based on the bone conduction audio signal. The processing device 122 may further identify the target set of equivalent air conduction data corresponding to the set of bone conduction data from the one or more sets of equivalent air conduction data based on the air conduction audio signal obtained in operation 604.

In some embodiments, the processing device 122 may input the bone conduction audio signal into the trained machine learning model and the trained machine learning model may output the one or more sets of equivalent air conduction data corresponding to the bone conduction audio signal and/or a probability of each of the one or more sets of equivalent air conduction data matching the bone conduction audio signal. The processing device 122 may determine the target set of equivalent air conduction data corresponding to the bone conduction audio signal from the one or more sets of equivalent air conduction data based on the air conduction audio signal obtained in operation 604.

In some embodiments, the processing device 122 may input the bone conduction audio signal and the air conduction audio signal into the trained machine learning model and the trained machine learning model may output the target set of equivalent air conduction data corresponding to the bone conduction audio signal.

In some embodiments, the processing device 122 may input the one or more sets of bone conduction data into the trained machine learning model and the trained machine learning model may output one or more sets of equivalent air conduction data corresponding to each of the one or more sets of bone conduction data and/or a probability of each of the one or more sets of equivalent air conduction data matching the set of bone conduction data. The processing device 122 may determine the target set of equivalent air conduction data corresponding to the set of bone conduction data from the one or more sets of equivalent air conduction data based on the one or more sets of air conduction data included in the air conduction audio signal obtained in operation 604.

In some embodiments, the processing device 122 may input the one or more sets of bone conduction data and the one or more sets of air conduction data into the trained machine learning model and the trained machine learning model may output the target set of equivalent air conduction data corresponding to the set of bone conduction data 4.

Figure 7:
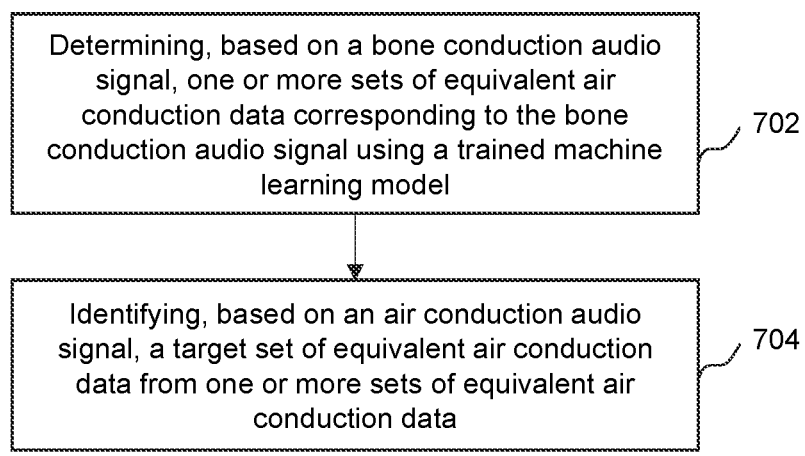
FIG. 7 is a schematic flowchart illustrating an exemplary process for determining a target set of equivalent air conduction data corresponding to a bone conduction audio signal according to some embodiments of the present disclosure.

More descriptions for the determination of the target set of equivalent air conduction data may be found elsewhere in the present disclosure (e.g., FIG. 7 and the descriptions thereof).

In 610, the processing device 122 (e.g., the output module 406) may cause, based on the target set of equivalent air conduction data, an audio signal output device to output a target audio signal representing the speech of the user.

In some embodiments, the processing device 122 may convert the target set of equivalent air conduction data into an equivalent air conduction audio signal, for example, in a time domain, in a frequency domain, using a speech synthesis algorithm (also referred to as a text to speech algorithm). Exemplary speech synthesis algorithms may include a linear predictive coding (LPC) algorithm, a pitch synchronous overlap and add (PSOLA) algorithm, etc.

The processing device 122 may determine a target audio signal based on the equivalent air conduction audio signal. In some embodiments, the processing device 122 may designate the equivalent air conduction audio signal as the target audio signal.

In some embodiments, the processing device 122 may perform one or more post-processing operations on the equivalent air conduction audio signal. For example, the processing device 122 may add additional information into the equivalent air conduction audio signal based on the air conduction audio signal. Exemplary additional information may include one or more types of background noises (e.g., noises derived from rain, noises derived from wind, etc.) similar to background noises in the air conduction audio signal, emotion characteristics of the user (e.g., anger, fear, sadness, happiness, etc.), acoustic characteristics of the user, or the like, or any combination thereof. The processing device 122 may designate the post-processed equivalent air conduction audio signal as the target audio signal, which may improve the fidelity and intelligibility of the determined target audio signal. In some embodiments, the additional information may also be referred to as noises.

In some embodiments, the target audio signal may include a noise level less than a noise level of the air conduction audio signal. In some embodiments, the target audio signal may include more frequency components than the bone conduction audio signal obtained in operation 602. In some embodiments, the target audio signal may represent semantic information or content that has a higher similarity with the actual semantic content of the speech of the user than the semantic information or content represented in the bone conduction audio signal obtained in operation 602.

The processing device 122 may cause the audio signal output device to output the target audio signal. In some embodiments, the processing device 122 may transmit a signal to a client terminal (e.g., the terminal 130), the storage device 140, and/or any other storage device (not shown in the audio signal generation system 100) via the network 150. The signal may include the target audio signal. The signal may be also configured to direct the client terminal to play the target audio signal.

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operations 602 and 604 may be integrated into one single operation.

FIG. 7 is a schematic flowchart illustrating an exemplary process for determining a target set of equivalent air conduction data corresponding to a bone conduction audio signal an audio signal according to some embodiments of the present disclosure. In some embodiments, a process 700 may be implemented as a set of instructions (e.g., an application) stored in the storage device 140, ROM 230 or RAM 240, or storage 390. The processing device 122, the processor 220, and/or the CPU 340 may execute the set of instructions, and when executing the instructions, the processing device 122, the processor 220, and/or the CPU 340 may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process 700 illustrated in FIG. 7 and described below is not intended to be limiting. In some embodiments, one or more operations of the process 700 may be performed to achieve at least part of operation 608 as described in connection with FIG. 6.

In 702, the processing device 122 (e.g., the determination module 404) may determine, based on a bone conduction audio signal, one or more sets of equivalent air conduction data corresponding to the bone conduction audio signal using a trained machine learning model. The bone conduction audio signal may be acquired as described in connection with operation 602 as described in FIG. 6.

In some embodiments, the trained machine learning model may provide a mapping relationship between a set of bone conduction data derived from a specific bone conduction audio signal and one or more sets of equivalent air conduction data derived from a specific equivalent air conduction signal corresponding to the specific conduction audio signal. More descriptions for the trained machine learning model may be found elsewhere in the present disclosure (e.g., FIG. 6 and the descriptions thereof).

In some embodiments, the trained machine learning model may include a first portion configured to perform a speech recognition, and a second portion configured to provide the mapping relationship between the set of bone conduction data derived from the specific bone conduction audio signal and the one or more sets of equivalent air conduction data derived from the specific equivalent air conduction signal corresponding to the specific conduction audio signal. The second portion may be further configured to determine one or more sets of equivalent air conduction data corresponding to a set of bone conduction data based on the mapping relationship.

In some embodiments, the first portion may include a speech recognition model configured to generate a set of bone conduction data from the bone conduction audio signal as described in operation 602. Exemplary speech recognition models may include a hidden Markov model (HMM), an end-to-end model, a connectionist temporal classification (CTC) model, or the like, or any combination thereof.

In some embodiments, the first portion of the trained machine learning model may be configured to extract acoustic characteristics from a specific audio signal (e.g., the bone conduction audio signal) to perform speech recognition. The recognition result of the specific audio signal using the first portion of the trained machine learning model may include one or more sets of data that represent semantic information of the specific audio signal in a form of text. The acoustic characteristics may be extracted from the specific audio signal using an acoustic characteristic extraction algorithm. Exemplary acoustic characteristic extraction algorithms may include an autocorrelation function (ACF) algorithm, an average amplitude difference function (AMDF) algorithm, a nonlinear feature extraction algorithm based on Teager energy operator (TEO), a linear predictive analysis (LPC) algorithm, a deep learning algorithm (e.g., a Laplacian Eigenmaps, a principal component analysis (PCA), a local preserved projection (LPP), etc.), etc.

The second portion of the trained machine learning model may be configured to generate one or more sets of equivalent air conduction data based on the mapping relationship and the set of bone conduction data. In some embodiments, the second portion may represent the mapping relationship as a table. For example, the table may include multiple reference sets of bone conduction data and multiple reference sets of equivalent air conduction data. Each of the multiple reference sets of bone conduction data may correspond to one or more reference sets of equivalent air conduction data. The table may include a matching probability of the reference set of bone conduction data matching each of the one or more reference sets of equivalent air conduction data. The second portion of the trained machine learning model may generate the one or more sets of equivalent air conduction data based on the table and the set of bone conduction data. For example, the second portion of the trained machine learning model may identify a reference set of bone conduction data that is the same as or similar to the set of bone conduction data from the table, obtain the one or more reference sets of equivalent air conduction data corresponding to the reference set of bone conduction data from the table, and designate the one or more reference sets of equivalent air conduction data as the one or more sets of equivalent air conduction data corresponding to the set of bone conduction data.

In some embodiments, the second portion may represent the mapping relationship as a function. In some embodiments, the second portion of the trained machine learning model may be configured to generate the one or more sets of equivalent air conduction data based on the set of bone conduction data using the function.

In some embodiments, the bone conduction audio signal may be inputted into the trained machine learning model. The trained machine learning model may extract bone conduction acoustic characteristics from the bone conduction audio signal. The bone conduction acoustic characteristics may include one or more features associated with duration, one or more features associated with energy, one or more features associated with fundamental frequency, one or more features associated with frequency spectrum, one or more features associated with phase spectrum, etc., as described in operation 602. The trained machine learning model may determine the set of bone conduction data based on the bone conduction acoustic characteristics. For example, the trained machine learning model may determine one or more bone conduction acoustic characteristics that can form a phoneme as the set of bone conduction data. As another example, the trained machine learning model may designate one or more phonemes that are composed of the bone conduction acoustic characteristics as the set of bone conduction data. As still another example, the trained machine learning model may designate one or more syllables that are composed of the one or more phonemes as the set of bone conduction data. As a further example, the trained machine learning model may designate one or more words that are composed of the one or more syllables as the set of bone conduction data. As still a further example, the trained machine learning model may designate one or more phrases that are composed of the one or more words as the set of bone conduction data. As a further example, the trained machine learning model may designate one or more sentences that are composed of the one or more phrases as the set of bone conduction data.

The trained machine learning model may determine the one or more sets of equivalent air conduction data and/or information relating to the one or more sets of equivalent air conduction data based on the set of bone conduction data and the mapping relationship provided by the trained machine learning model. For example, the first portion of the trained machine learning model may determine the set of bone conduction data from the bone conduction audio signal. The second portion of the trained machine learning model may compare the set of bone conduction data with the multiple reference sets of bone conduction data provided by the second portion of the trained machine learning model. The second portion of the trained machine learning model may determine the one or more sets of equivalent air conduction data corresponding to the set of bone conduction data based on the comparison.

For example, the second portion of the trained machine learning model may determine a similarity or correlation degree between the set of bone conduction data with each of the multiple reference sets of bone conduction data in the table. The second portion of the trained machine learning model may determine one of the multiple reference sets of bone conduction data in the table that has a maximum similarity or correlation degree with the set of bone conduction data. The second portion of the trained machine learning model may output the one or more reference sets of equivalent air conduction data corresponding to the one of the multiple reference sets of bone conduction data in the table that has the maximum similarity or correlation degree with the set of bone conduction data derived from the bone conduction audio signal. In some embodiments, the second portion of the trained machine learning model may also output matching probabilities between the one or more reference sets of equivalent air conduction data and the one of the multiple reference sets of bone conduction data in the table that has the maximum similarity or correlation degree with the set of bone conduction data derived from the bone conduction audio signal.

In some embodiments, the processing device 122 may designate the one or more reference sets of equivalent air conduction data corresponding to the one of the multiple reference sets of bone conduction data in the table as the one or more sets of equivalent air conduction data corresponding to the set of bone conduction audio data.

In some embodiments, the processing device 122 may determine a portion of the one or more reference sets of equivalent air conduction data as the one or more sets of equivalent air conduction data corresponding to the set of bone conduction audio data based on information (e.g., the matching probabilities) relating to the one or more reference sets of equivalent air conduction data. The processing device 122 may determine the one or more sets of equivalent air conduction data based on the one or more reference sets of equivalent air conduction data and the one or more matching probabilities. For example, the processing device 122 may determine one or more reference sets of equivalent air conduction data with matching probabilities greater than a certain threshold (e.g., 0.9, 0.8, 0.7, etc.) as the one or more sets of equivalent air conduction data. As another example, the one or more matching probabilities corresponding to the one or more sets of equivalent air conduction data may be sorted in descending order, and the processing device 122 may determine the top one or more reference sets of equivalent air conduction data as the one or more sets of equivalent air conduction data according to the descending order.

In 704, the processing device 122 (e.g., the determination module 404) may identify, based on an air conduction audio signal, a target set of equivalent air conduction data from the one or more sets of equivalent air conduction data.

The air conduction audio signal and the bone conduction audio signal may represent the same speech of the user with different frequency components. The air conduction audio signal may be acquired as described in connection with operation 604 as described in FIG. 6.

In some embodiments, the processing device 122 may determine a set of air conduction audio data by processing the air conduction audio signal. The set of air conduction data and the set of bone conduction data may be derived from at least a portion of the air conduction audio signal and at least a portion of the bone conduction audio signal, respectively that are acquired by the air conduction sensor and the bone conduction sensor simultaneously. In other words, the set of air conduction data and the set of bone conduction data may represent the same actual semantic content of the speech of the user. More descriptions for the set of air conduction data may be found elsewhere in the present disclosure (e.g., FIG. 6 and the descriptions thereof).

In some embodiments, the processing device 122 may determine the set of air conduction data by extracting acoustic characteristics from the air conduction audio signal (also referred to as air conduction acoustic characteristics). In some embodiments, the air conduction acoustic characteristics may be extracted from the air conduction audio signal using a speech recognition model or an acoustic characteristic extraction algorithm as described elsewhere in this disclosure (e.g., operation 702 and the relevant descriptions). In some embodiments, the air conduction acoustic characteristics may be extracted from the air conduction audio signal using the first portion of the trained machine learning model. The air conduction acoustic characteristics may include one or more features associated with duration, one or more features associated with energy, one or more features associated with fundamental frequency, one or more features associated with frequency spectrum, one or more features associated with phase spectrum, etc., as described in operation 602.

The processing device 122 may determine the set of air conduction data based on the air conduction acoustic characteristics. For example, the determination of the set of air conduction data based on the air conduction acoustic characteristics may be performed in a similar manner as the determination of the set of bone conduction data based on the bone conduction acoustic characteristics as described in connection with operation 702, and the descriptions thereof are not repeated here.

The processing device 122 may identify the target set of equivalent air conduction data from the one or more sets of equivalent air conduction data by determining a correlation degree between each set of equivalent air conduction data and the set of air conduction data. In some embodiments, the processing device 122 may determine the correlation degree between the set of equivalent air conduction data and the set of air conduction data using a similarity algorithm. Exemplary similarity algorithms may include a cosine similarity algorithm, a Jaccard coefficient algorithm, a dice coefficient algorithm, etc. In some embodiments, the processing device 122 may determine the correlation degree between the set of equivalent air conduction data and the set of air conduction data using a machine learning model for determining semantic similarity. Exemplary machine learning models for determining semantic similarity may include a deep structured semantic model (DSSM), a convolutional latent semantic model (CLSM), a long-short-term memory-deep structured semantic model (LSTM-DSSM), or the like, or any combination thereof.

The processing device 122 may determine one of the one or more sets of equivalent air conduction data that has a maximum correlation degree with the set of air conduction data among the one or more sets of equivalent air conduction data as an initial target set of equivalent air conduction data. The processing device 122 may determine the target set of equivalent air conduction data based on the initial target set of equivalent air conduction data.

In some embodiments, the processing device 122 may designate the initial target set of equivalent air conduction data as the target set of equivalent air conduction data.

In some embodiments, the processing device 122 may perform one or more post-processing operations on the initial target set of equivalent air conduction data. For example, the processing device 122 may perform a semantic information calibration operation for the initial target set of equivalent air conduction data based on the set of air conduction data. The semantic information calibration operation may refer to an operation for adjusting or calibrating semantic information of the initial target set of equivalent air conduction data according to semantic information of the set of air conduction data so that the semantic information of the initial target set of equivalent air conduction data is the same as or more similar to the semantic information of the set of air conduction data. The processing device 122 may designate the post-processed initial target set of equivalent air conduction data as the target set of equivalent air conduction data.

It should be noted that the above description regarding the process 700 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, process 700 may further include an operation of determining the set of bone conduction data from the bone conduction audio signal and/or an operation of determining the set of air conduction data from the air conduction audio signal.

Figure 8:
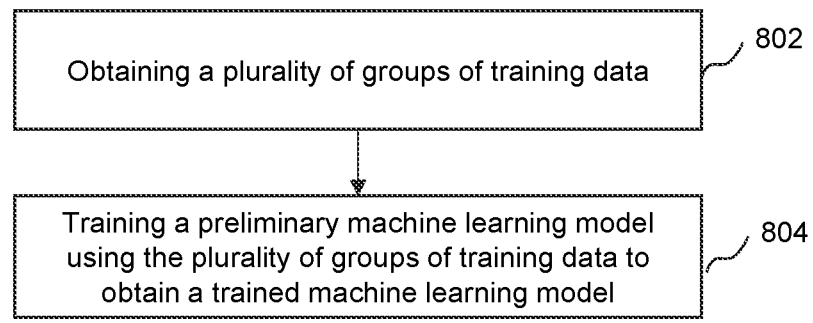
FIG. 8 is a schematic flowchart illustrating an exemplary process for generating a trained machine learning model according to some embodiments of the present disclosure.

FIG. 8 is a schematic flowchart illustrating an exemplary process for generating a trained machine learning model according to some embodiments of the present disclosure. In some embodiments, a process 800 may be implemented as a set of instructions (e.g., an application) stored in the storage device 140, ROM 230 or RAM 240, or storage 390. The processing device 122, the processor 220, and/or the CPU 340 may execute the set of instructions, and when executing the instructions, the processing device 122, the processor 220, and/or the CPU 340 may be configured to perform the process 800. In some embodiments, the trained machine learning model described in connection with operation 606 in FIG. 6 may be obtained according to the process 800. In some embodiments, the process 800 may be performed by another device or system other than the audio signal generation system 100, e.g., a device or system of a vendor or a manufacturer of the trained machine learning model. For illustration purposes, the implementation of the process 800 by the processing device 122 is described as an example.

In 802, the processing device 122 (e.g., the acquisition module 502) may obtain a plurality of groups of training data.

In some embodiments, each group of the plurality of groups of training data may include a first audio signal and a second audio signal that represent the same speech sample.

In some embodiments, the first audio signal and the second audio signal may be simultaneously acquired by a bone conduction audio acquisition device (e.g., the bone conduction microphone 112) and an air conduction audio acquisition device (e.g., the air conduction microphone 114), respectively when the speech sample is made under a noiseless condition, and stored in one or more components of the audio signal generation system 100 (e.g., the storage device 140, the terminals(s) 130) or an external source. The processing device 122 may obtain the first audio signal and the second audio signal from the one or more components of the audio signal generation system 100. As used herein, the noiseless condition may refer to that one or more noise evaluation parameters (e.g., the noise standard curve, a statistical noise level, etc.) satisfy a condition, such as less than a threshold. The first audio signal may also be referred to as a bone conduction audio signal and the second audio signal may also be referred to as an air conduction audio signal.

In some embodiments, the bone conduction audio signal in a group of training data may be used as an input of the preliminary machine learning model, and the air conduction audio signal corresponding to the bone conduction data in the speech sample may be used as a desired output of the preliminary machine learning model during a training process of the preliminary machine learning model during the training of the preliminary machine learning model. In some embodiments, the bone conduction audio signal and the air conduction audio signal in a group of training data may be used as an input of the preliminary machine learning model.

In some embodiments, the bone conduction audio signal in each of the plurality of groups of training data may be collected by a bone conduction sensor positioned at the same region (e.g., the area around an ear) of the body of a user (e.g., a tester). In some embodiments, the region of the body where a bone conduction sensor is positioned for collecting the bone conduction data used for the training of the trained machine learning model may be consistent with and/or the same as the region of the body where the bone conduction sensor is positioned for collecting bone conduction data (e.g., the first audio data) used for the application of the trained machine learning model. For example, the region of the body of a user (e.g., a tester) where the bone conduction sensor is positioned for collecting the bone conduction audio signal in each group of the plurality of groups of training data may be the same as a region of the body of the user where the bone conduction sensor is positioned for collecting the bone conduction audio signal as described in operation 602. As a further example, if a region of the body of the user where the bone conduction sensor is positioned for collecting the bone conduction audio signal as described in operation 602 is the neck, a region of a body where a bone conduction sensor is positioned for collecting the bone conduction data used in the training process of the trained machine learning model is the neck of the body.

The region of the body of a user (e.g., a tester) where the bone conduction sensor is positioned for collecting the plurality of groups of training data may affect the corresponding relationship between a set of bone conduction data derived from the bone conduction audio signal and one or more sets of air conduction data derived from the air conduction audio signal in each group of training data. In some embodiments, multiple bone conduction sensors in the same configuration may be located at different regions of a body, such as the mastoid, a temple, the top of the head, the external auditory meatus, etc. The multiple bone conduction sensors may simultaneously collect bone conduction data when the user speaks. Multiple training sets may be formed based on the bone conduction audio signals collected by the multiple bone conduction sensors. Each of the multiple training sets may include a plurality of groups of training data collected by one of the multiple bone conduction sensors and an air conduction sensor. Each of the plurality of groups of training data may include a bone conduction audio signal and an air conduction audio signal representing the same speech. Each of the multiple training sets may be used to train a machine learning model to obtain a trained machine learning model. Multiple trained machine learning models may be obtained based on the multiple training sets. The multiple trained machine learning models may provide different mapping relationships between specific bone conduction data and air conduction data. For example, different air conduction data may be generated by inputting the same bone conduction data into multiple trained machine learning models respectively. In some embodiments, bone conduction data collected by different bone conduction sensors in the configuration may be different. Therefore, the bone conduction sensor for collecting the bone conduction data used for the training of the trained machine learning model may be consistent with and/or the same as the bone conduction sensor for collecting bone conduction audio signal used for the application of the trained machine learning model in the configuration.

In 804, the processing device 122 (e.g., the model generation module 508) may train a preliminary machine learning model using the plurality of groups of training data to obtain a trained machine learning model.

The preliminary machine learning model may also be referred to as a model to be trained. The preliminary machine learning model may be of any type of model (e.g., an HMM model) as described elsewhere in this disclosure (e.g., FIG. 6 and the relevant descriptions). In some embodiments, the preliminary machine learning model may be a machine learning model that has been never trained using a training set. In some embodiments, the preliminary machine learning model may be a trained machine learning model that is trained using a training set including training data that is different from the plurality of groups of training data obtained in operation 802. In some embodiments, the processing device 122 may obtain the preliminary machine learning model from one or more components of the audio signal generation system 100 (e.g., the storage device 140, the terminals(s) 130) or an external source (e.g., a database of a third-party) via a network (e.g., the network 150).

In some embodiments, the preliminary machine learning model may be constructed based on a neural network model (e.g., a multilayer perceptron), a statistical model (e.g., a hidden Markov model (HMM)), or the like, or a combination thereof. In some embodiments, the preliminary machine learning model may include a multi-layer structure. For example, the preliminary machine learning model may include an input layer, an output layer, and one or more hidden layers between the input layer and the output layer. In some embodiments, the hidden layers may include one or more convolution layers, one or more rectified-linear unit layers (ReLU layers), one or more pooling layers, one or more fully connected layers, or the like, or any combination thereof. As used herein, a layer of a model may refer to an algorithm or a function for processing input data of the layer. Different layers may perform different kinds of processing on their respective input. A successive layer may use output data from a previous layer of the successive layer as input data. In some embodiments, the convolutional layer may include a plurality of kernels, which may be used to extract a feature. In some embodiments, each kernel of the plurality of kernels may filter a portion (i.e., a region). The pooling layer may take an output of the convolutional layer as an input. The pooling layer may include a plurality of pooling nodes, which may be used to sample the output of the convolutional layer, so as to reduce the computational load of data processing and accelerate the speed of data processing. In some embodiments, the size of the matrix representing the inputted data may be reduced in the pooling layer. The fully connected layer may include a plurality of neurons. The neurons may be connected to the pooling nodes in the pooling layer. In the fully connected layer, a plurality of vectors corresponding to the plurality of pooling nodes may be determined based on a training sample, and a plurality of weighting coefficients may be assigned to the plurality of vectors. The output layer may determine an output based on the vectors and the weighting coefficients obtained from the fully connected layer.

In some embodiments, each of the layers may include one or more nodes. In some embodiments, each node may be connected to one or more nodes in a previous layer. The number of nodes in each layer may be the same or different. In some embodiments, each node may correspond to an activation function. As used herein, an activation function of a node may define an output of the node given input or a set of inputs. In some embodiments, each connection between two of the plurality of nodes in the initial machine learning model may transmit a signal from one node to another node.

In some embodiments, each connection may correspond to a weight. As used herein, a weight corresponding to a connection may be used to increase or decrease the strength or impact of the signal at the connection.

The machine learning model may include a plurality of parameters, such as architecture parameters, learning parameters, etc. Exemplary architecture parameters of the machine learning model may include the size of a kernel of a layer, the total count (or number) of layers, the count (or number) of nodes in each layer, a learning rate, a batch size, an epoch, etc. Exemplary learning parameters may include a connected weight between two connected nodes, a bias vector relating to a node, etc.). Before the training, the machine learning model may have one or more initial parameter values. In the training of the machine learning model, learning parameters of the machine learning model may be updated. Before the updating process, values of the learning parameters of the machine learning model may be initialized. For example, the connected weights and/or the bias vector of nodes of the initial machine learning model may be initialized by assigning random values in a range, e.g., the range from −1 to 1. As another example, all the connected weights of the initial machine learning model may be assigned the same value in the range from −1 to 1, for example, 0. As still an example, the bias vector of nodes in the initial machine learning model may be initialized by assigning random values in a range from 0 to 1. In some embodiments, the parameters of the initial machine learning model may be initialized based on a Gaussian random algorithm, a Xavier algorithm, etc.

In some embodiments, the processing device 122 may train the preliminary machine learning model using a training algorithm to obtain the trained machine learning model. Exemplary training algorithms may include a backpropagation algorithm, a gradient descent algorithm, a Newton's algorithm, a quasi-Newton algorithm, a Levenberg-Marquardt algorithm, a conjugate gradient algorithm, or the like, or a combination thereof.

In some embodiments, the training of the preliminary machine learning model may include a plurality of iterations. In each iteration, the first audio signal or the set of bone conduction data may serve as an input of the preliminary machine learning model; and the set of air conduction data may serve as a desired output of the preliminary machine learning model. The preliminary machine learning model may extract first acoustic characteristics from the first audio signal and second acoustic characteristics from the second audio signal. For example, the preliminary machine learning model may extract the first acoustic characteristics and the second acoustic characteristics using a sub-model (e.g., a speech recognition model as described in operation 702). As another example, the preliminary machine learning model may extract the first acoustic characteristics and the second acoustic characteristics using an acoustic characteristic extraction algorithm as described elsewhere in this disclosure (e.g., operation 702 and the relevant descriptions). The first acoustic characteristics and the second acoustic characteristics may include one or more features associated with duration, one or more features associated with energy, one or more features associated with fundamental frequency, one or more features associated with frequency spectrum, one or more features associated with phase spectrum, etc., as described in operation 602. The preliminary machine learning model (e.g., the first portion of the preliminary machine learning model) may determine one or more first sets of bone conduction data based on the first acoustic characteristics and one or more second sets of air conduction data based on the second acoustic characteristics. Each of the one or more first sets of bone conduction data and the one or more second sets of air conduction data may include one or more phonemes that are composed of the acoustic characteristics, one or more syllables that are composed of the one or more phonemes, one or more words that are composed of the one or more syllables, one or more phrases that are composed of the one or more words, one or more sentences that are composed of the one or more phrases, or the like, or any combination thereof.

The preliminary machine learning model (e.g., the second portion of the preliminary machine learning model) may determine multiple pairs of air conduction data and bone conduction data. Each pair may include a first set of bone conduction data and a second set of air conduction data that represents the same semantics. In some embodiments, the preliminary machine learning model may determine a matching probability that each of the one or more first sets of bone conduction data matches each of the one or more second sets of air conduction data. A matching probability that a first set of bone conduction data matches a second set of air conduction data may indicate a similarity or correlation degree between the semantic information represented by the first set of bone conduction data and the semantic information represented by the second set of air conduction data. The similarity or correlation degree between the semantic information represented by the first set of bone conduction data and the semantic information represented by the second set of air conduction data may be the matching probability that the first set of bone conduction data matches the second set of air conduction data. Merely by way of example, the preliminary machine learning model may determine a correlation degree between each of the one or more first sets of bone conduction data and each of the one or more second sets of air conduction data using a similarity algorithm as described elsewhere in this disclosure (e.g., operation 704 and the relevant descriptions). The preliminary machine learning model may determine the correlation degree as the matching probability.

In the training of the machine learning model, the processing device 122 may iteratively update the parameter value(s) of the preliminary machine learning model based on the plurality of training samples. The updating of the learning parameters of the machine learning model may be also referred to as updating the machine learning model. For example, the processing device 122 may update the model parameter(s) of the machine learning model by performing one or more iterations until a termination condition is satisfied. In some embodiments, the preliminary machine learning model may determine a difference or error associated with the matching probability and a threshold using a cost function. If the value of the cost function does not satisfy a condition, the processing device 122 may adjust parameter values of the preliminary machine learning model in the current iteration based on the value of the cost function using a backpropagation algorithm.

The processing device 122 (e.g., the model generation module 504) may determine whether a termination condition is satisfied. The termination condition may provide an indication of whether the machine learning model is sufficiently trained. The termination condition may relate to a cost function or an iteration count of the training process. For example, the processing device 122 may determine a cost function of the machine learning model and determine a value of the cost function based on the difference between the estimated output and the actual output or desired output (i.e., reference output). Further, the processing device 122 may determine the termination condition is satisfied if the value of the cost function is less than a threshold. The threshold may be default settings of the system 100 or may be adjustable under different situations. As another example, the termination condition may be satisfied if the value of the cost function converges. The convergence may be deemed to have occurred if the variation of the values of the cost function in two or more consecutive iterations is smaller than a threshold (e.g., a constant). As still another example, the processing device 122 may determine the termination condition is satisfied if a specified number (or count) of iterations are performed in the training process.

In response to a determination that the termination condition is satisfied, the processing device 122 may designate the machine learning model with the parameter values updated in the last iteration as the trained machine learning model (e.g., a trained machine learning model). On the other hand, in response to a determination that the termination condition is not satisfied, the processing device 120 may update at least some of the parameter values of the machine learning model based on the assessment result. For example, the processing device 122 may update the value(s) of the learning parameter(s) of the machine learning model based on the value of the cost function according to, for example, a backpropagation algorithm. The processing device 120 may proceed to perform the next iteration until the termination condition is satisfied. In the next iteration, the processing device 122 may obtain another group of training data. After the termination condition is satisfied in a certain iteration, the machine learning model in the certain iteration having the updated value(s) of the learning parameter(s) may be designated as the trained machine learning model (e.g., the trained machine learning model).

The trained machine learning model (e.g., the second portion of the preliminary machine learning model) may provide the mapping relationship between each of the one or more first sets of bone conduction data and at least one of the one or more second sets of air conduction data based on the multiple pairs of air conduction data and bone conduction data. In some embodiments, each of the multiple pairs of bone conduction data and air conduction data may refer to a pair of bone conduction data and air conduction data with a corresponding relationship. As used herein, the corresponding relationship may refer to that the set of bone conduction data corresponds to the set of air conduction data. The set of bone conduction data may correspond to the set of air conduction data if a similarity or a correlation degree between the semantic information represented by the set of bone conduction data and the semantic information represented by the set of the air conduction data exceeds a threshold, such as 90%, 95%, 99%, etc. The preliminary machine learning model may establish the mapping relationship between each of the one or more first sets of bone conduction data and at least one of the one or more second sets of air conduction data based on the corresponding relationship. The mapping relationship may include a mapping relationship between acoustic characteristics, a mapping relationship between phonemes, a mapping relationship between syllables, a mapping relationship between words, or the like, or any combination thereof. More descriptions for the mapping relationship may be found elsewhere in the present disclosure (e.g., FIG. 6 and the descriptions thereof).

For example, the one or more first sets of bone conduction data include a syllable A and a syllable B, and the one or more second sets of air conduction data include a syllable C, a syllable D, a syllable E, a syllable F, and a syllable G. The multiple pairs of conduction audio data and bone air conduction data include A-C, A-D, B-E, B-F, B-G. A and C, A and D, B and E, B and F, B and G may be pairs of conduction audio data and bone air conduction data with the corresponding or matching relationship. The mapping relationship may be represented as $$A\begin{cases} \to C \\ \to D \end{cases}, B\begin{cases} \to E \\ \to F. \\ \to G \end{cases}$$

In some embodiments, the preliminary machine learning model may include a first portion (also referred to as a first sub-model) and a second portion (also referred to as a second sub-model). The first portion may be trained to obtain a speech recognition model. The first portion may be configured to decompose an audio signal into one or more units (also referred to as an acoustic vector) by extracting acoustic characteristics of the audio signal. Each unit may also be referred to as a set of audio data derived from the audio signal. A unit of an audio signal (i.e., a set of audio data) may include a phoneme that is composed of acoustic characteristics, a syllable that is composed of one or more phonemes, a word that is composed of the one or more syllables, a phrase that is composed of the one or more words, a sentence that is composed of the one or more phrases, or the like, or any combination thereof. For example, the first audio signal may be decomposed by the first portion to obtain multiple sets of bone conduction data (i.e., multiple bone conduction units) and the second audio signal may be decomposed by the first portion to obtain multiple sets of air conduction data (i.e., multiple air conduction units). In some embodiments, the first portion of the preliminary machine learning model may include an encoder that includes a machine learning model (such as a conventional neural network model, a deep neural network model, etc.).

The second portion may be trained to establish a mapping relationship between multiple sets of bone conduction data and multiple sets of air conduction data. The mapping relationship between multiple sets of bone conduction data and multiple sets of air conduction data may also be referred to as a matching relationship for each of the multiple sets of bone conduction data matching one or more of the multiple sets of air conduction data. In some embodiments, if a correlation degree between a set of bone conduction data and a set of air conduction data exceeds a threshold, the set of bone conduction data may match the set of air conduction data and a matching relationship may be established between the set of bone conduction data and the set of air conduction data.

In some embodiments, the correlation degree between a set of bone conduction data and a set of air conduction data may be denoted as a similarity degree between the set of bone conduction data and the set of air conduction data. In some embodiments, the second portion may include a similarity determination function. The second portion may determine a correlation degree between each of the multiple sets of bone conduction data and each of the multiple sets of air conduction data using the similarity determination function. Exemplary similarity determination function may include a cosine similarity function, a Jaccard coefficient function, a dice coefficient function, etc. In some embodiments, the second portion may include a machine learning model for determining semantic similarity. Exemplary machine learning models for determining semantic similarity may include a deep structured semantic model (DSSM), a convolutional latent semantic model (CLSM), a long-short-term memory-deep structured semantic model (LSTM-DSSM), or the like, or any combination thereof.

Figure 9:
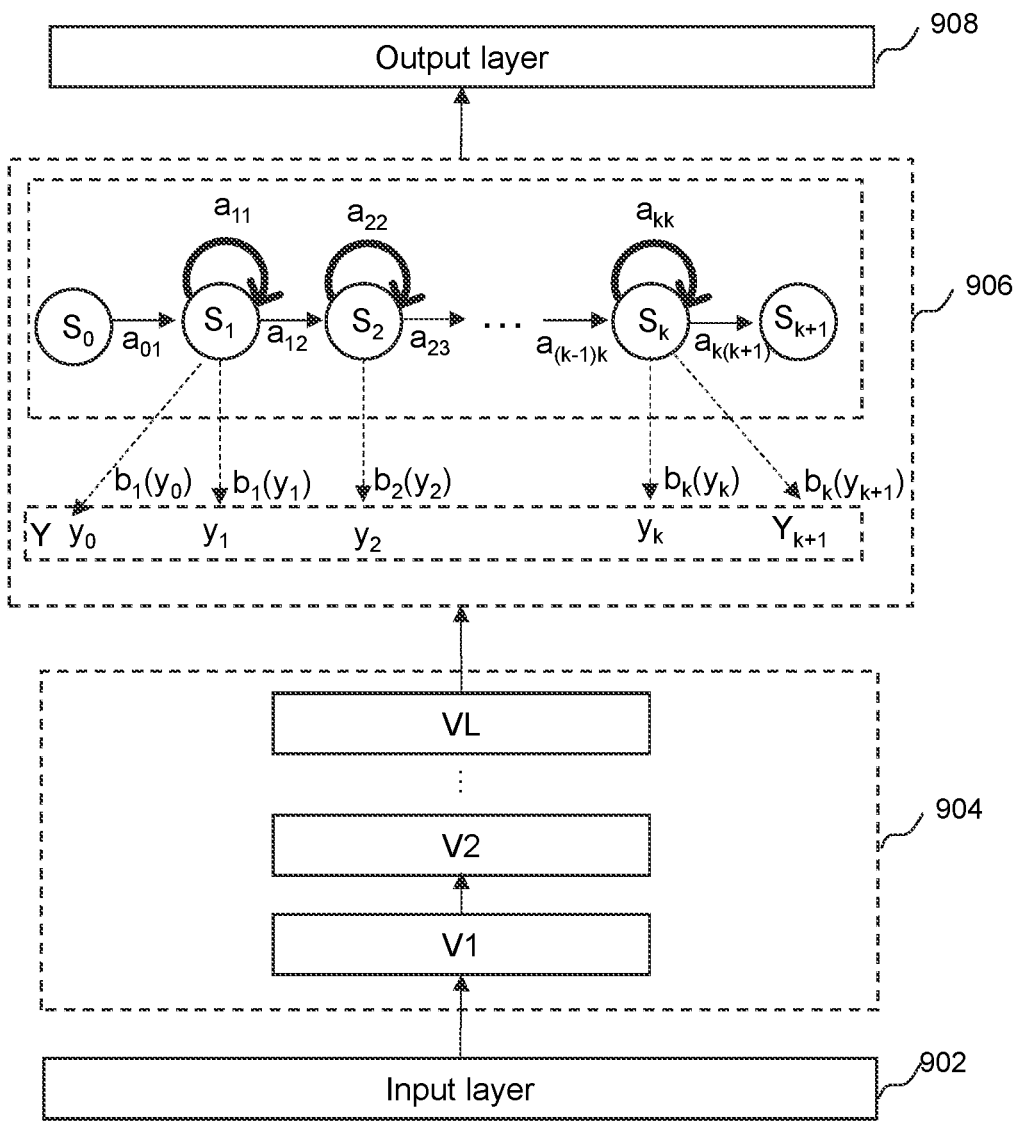
FIG. 9 is a schematic diagram illustrating an exemplary preliminary machine learning model according to some embodiments of the present disclosure.

Merely by way of example, FIG. 9 is a schematic diagram illustrating an exemplary preliminary machine learning model according to some embodiments of the present disclosure. As shown in FIG. 9, the preliminary machine learning model may include an input layer 902, an encoder 904, a decoder 906, an output layer 908. The encoder 904 may also be referred to as a first portion of the preliminary machine learning model (i.e., the first sub-model). The input layer 902 may be configured to input audio signals. The encoder 904 may be configured to convert an inputted audio signal (e.g., the first audio signal and the second audio signal) to a sequence of acoustic vectors. In some embodiments, the encoder 904 may include a neural network model (e.g., a CNN, a DNN, etc.) that includes multiple layers V1, V2, . . . , VL. The decoder 906 may be configured to determine one or more acoustic vectors corresponding to an audio signal that is most likely to each acoustic vector in a sequence acoustic vector corresponding to another audio signal. The decoder 906 may include a neural network model (e.g., a CNN, a DNN, etc.), a Bayesian network model (e.g., an HMM), etc. As shown in FIG. 9, the decoder 906 may include an HMM. Parameters of the HMM may be denoted as (p, A, B), wherein p refers to an initial probability matrix, A refers to a hidden state transition matrix, and B refers to a probability matrix that a hidden state transits to an observation state. The hidden state transfer matrix A may include hidden state transition probabilities, such as a transition probability $a_{01}$ from hidden state $S_0$ to hidden state $S_1$, a transition probability $a_{12}$ from hidden state $S_1$ to hidden state $S_2$, . . . , a transition probability $a_{k(k+1)}$ from hidden state $S_k$ to hidden state $S_{k+1}$. The probability matrix B that a hidden state transits to an observation state may include hidden state to observation state transition probabilities, such a transition probability $b_1(y_0)$ from hidden state $S_1$ to observation state $y_0$, a transition probability $b_1(y_1)$ from hidden state $S_1$ to observation state $y_1$, . . . , a transition probability $b_k(y_k)$ from hidden state $S_k$ to observation state $y_k$. For each iteration, the input layer 902 may input audio signals (e.g., the first audio signal and the second audio signal, e.g., audio waveforms) in a group of training data. The encoder 904 may extract acoustic characteristics of each audio signal (e.g., the first audio signal and the second audio signal) to form a first sequence of acoustic vectors corresponding to the first audio signal and a second sequence of acoustic vectors corresponding to the second audio signal. In some embodiments, an acoustic vector in the sequence of acoustic vectors corresponding to an audio signal may include acoustic characteristics of each unit of the audio signal (e.g., a phoneme that is composed of acoustic characteristics, a syllable that are composed of one or more phonemes, a word that is composed of the one or more syllables, a phrase that are composed of the one or more words, a sentence that is composed of the one or more phrases). The decoder 906 may determine a hidden state sequence (i.e., $S_0$, $S_1$, $S_2$, . . . , $S_k$, $S_{k+1}$) based on the parameters of the decoder 906 and the observation state sequence (i.e., $y_0$, $y_1$, $y_2$, . . . , $y_k$, $y_{k+1}$). In other words, the decoder 906 may determine one or more acoustic vectors in the second sequence corresponding to the second audio signal that is most likely to each acoustic vector in the first sequence corresponding to the first audio signal based on the parameters of the decoder 906. Then the decoder 906 may establish a mapping relationship between one or more acoustic vectors in the second sequence corresponding to the second audio signal and each acoustic vector in the first sequence corresponding to the first audio signal. The decoder 906 may adjust the parameters of the decoder 906 and the encoder 904 to obtain an optimal solution (i.e., the one or more acoustic vectors in the second sequence corresponding to the second audio signal that is most likely to each acoustic vector in the first sequence corresponding to the first audio signal) for example, according to a Baum-Welch algorithm. In some embodiments, the decoder 906 may determine the optimal solution (i.e., the one or more acoustic vectors in the second sequence corresponding to the second audio signal that is most likely to each acoustic vector in the first sequence corresponding to the first audio signal) using a likelihood maximum estimation algorithm.

It should be noted that the above description regarding the process 800 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, process 800 may further include an operation of initializing parameter values of the preliminary machine learning model and/or an operation of storing the trained machine learning model.

Figure 10:
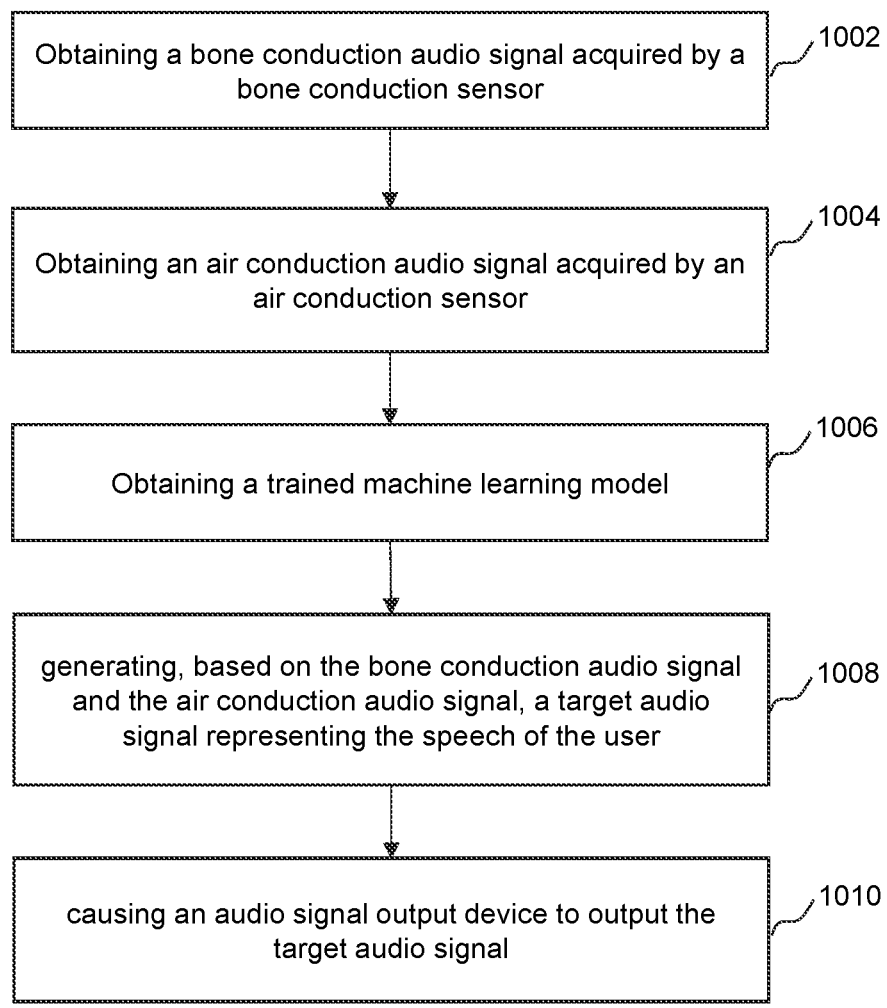
FIG. 10 is a schematic flowchart illustrating another exemplary process for generating an audio signal according to some embodiments of the present disclosure.

FIG. 10 is a schematic flowchart illustrating an exemplary process for generating an audio signal according to some embodiments of the present disclosure. In some embodiments, a process 1000 may be implemented as a set of instructions (e.g., an application) stored in the storage device 140, ROM 230 or RAM 240, or storage 390. The processing device 122, the processor 220, and/or the CPU 340 may execute the set of instructions, and when executing the instructions, the processing device 122, the processor 220, and/or the CPU 340 may be configured to perform the process 1000. The operations of the illustrated process presented below are intended to be illustrative. In some embodiments, the process 1000 may be accomplished with one or more additional operations not described and/or without one or more of the operations discussed. Additionally, the order in which the operations of the process 1000 illustrated in FIG. 10 and described below is not intended to be limiting.

In 1002, the processing device 122 (e.g., the acquisition module 402) may obtain a bone conduction audio signal acquired by a bone conduction sensor.

In some embodiments, the processing device 122 may obtain the bone conduction audio signal from the bone conduction sensor (e.g., the bone conduction microphone 112), the terminal 130, the storage device 140, or any other storage device via the network 150 in real-time or periodically. The bone conduction audio signal may be acquired and/or generated by the bone conduction sensor when a user speaks. In some embodiments, operation 1002 may be similar to or the same as operation 602 of the process 600 as illustrated in FIG. 6.

In 1004, the processing device 122 (e.g., the acquisition module 402) may obtain an air conduction audio signal acquired by an air conduction sensor.

In some embodiments, the processing device 122 may obtain the air conduction audio signal from the air conduction sensor (e.g., the air conduction microphone 114), the terminal 130, the storage device 140, or any other storage device via the network 150 in real-time or periodically. The air conduction audio signal may be acquired and/or generated by the air conduction sensor when a user speaks. In some embodiments, operation 1004 may be similar to or the same as operation 604 of the process 600 as illustrated in FIG. 6.

In 1006, the processing device 122 (e.g., the acquisition module 402) may obtain a trained machine learning model.

In some embodiments, the trained machine learning model may be reconstructed based on a neural network model (e.g., a deep learning model). Exemplary deep learning models may include a convolutional neural network (CNN) model, a recurrent neural network (RNN) model, a long short-term memory network (LSTM) model, or the like, or a combination thereof.

In some embodiments, the processing device 122 may obtain the trained machine learning model from one or more components of the audio signal generation system 100 (e.g., the storage device 140, the terminals(s) 130) or an external source via a network (e.g., the network 150). For example, the trained machine learning model may be previously trained by a computing device (e.g., the processing device 122), and stored in a storage device (e.g., the storage device 140) of the audio signal generation system 100. The processing device 122 may access the storage device and retrieve the trained machine learning model.

In some embodiments, the trained machine learning model may be generated according to a training algorithm by the processing device 122 or another computing device (e.g., a computing device of a vendor of the trained machine learning model). Exemplary training algorithms may include a gradient descent algorithm, a Newton's algorithm, a quasi-Newton algorithm, a Levenberg-Marquardt algorithm, a conjugate gradient algorithm, or the like, or a combination thereof.

Merely by way of example, the trained machine learning model may be obtained by a process. The process may include obtaining a plurality of groups of training data and a preliminary machine learning model and training the preliminary machine learning model using the plurality of groups of training data. Each group of the plurality of groups of training data may include a bone conduction audio signal, an air conduction audio signal, and a reference air conduction audio signal. In the training of the preliminary machine learning model, the bone conduction audio signal and the air conduction audio signal in each group of training data may serve as an input of the preliminary machine learning model, and the reference air conduction audio signal may serve as a desired output of the preliminary machine learning model. The bone conduction audio signal, the air conduction audio signal, and the reference air conduction audio signal in each group of training data may represent the same speech of a user. The reference air conduction audio signal may include a noise level less than the air conduction audio signal in each group of training data.

In some embodiments, the bone conduction audio signal and the reference air conduction audio signal in a group of training data may be acquired by a bone conduction sensor and an air conduction sensor, respectively under a noiseless condition when the user makes the speech. The air conduction audio signal in the group of training data may be acquired by adding noises in the reference air conduction audio signal in the group of training data.

In some embodiments, the bone conduction audio signal and the air conduction audio signal in a group of training data may be acquired by a bone conduction sensor and an air conduction sensor, respectively under a noise condition when the user makes the speech. The reference air conduction audio signal in the group of training data may be acquired by denoising the air conduction audio signal in the group of training data.

In some embodiments, the bone conduction audio signal and the air conduction audio signal in a group of training data may be acquired by a bone conduction sensor and an air conduction sensor, respectively under a noise condition when the user makes the speech. The reference air conduction audio signal in the group of training data may be acquired by the air conduction sensor, respectively under a noiseless condition.

In some embodiments, the machine learning model may include a multi-layer structure. For example, the machine learning model may include an input layer, an output layer, and one or more hidden layers between the input layer and the output layer. In some embodiments, the hidden layers may include one or more convolution layers, one or more rectified-linear unit layers (ReLU layers), one or more pooling layers, one or more fully connected layers, or the like, or any combination thereof. As used herein, a layer of a model may refer to an algorithm or a function for processing input data of the layer. Different layers may perform different kinds of processing on their respective input. A successive layer may use output data from a previous layer of the successive layer as input data. In some embodiments, the convolutional layer may include a plurality of kernels, which may be used to extract a feature. In some embodiments, each kernel of the plurality of kernels may filter a portion (i.e., a region). The pooling layer may take an output of the convolutional layer as an input. The pooling layer may include a plurality of pooling nodes, which may be used to sample the output of the convolutional layer, so as to reduce the computational load of data processing and accelerate the speed of data processing. In some embodiments, the size of the matrix representing the inputted data may be reduced in the pooling layer. The fully connected layer may include a plurality of neurons. The neurons may be connected to the pooling nodes in the pooling layer. In the fully connected layer, a plurality of vectors corresponding to the plurality of pooling nodes may be determined based on a training sample, and a plurality of weighting coefficients may be assigned to the plurality of vectors. The output layer may determine an output based on the vectors and the weighting coefficients obtained from the fully connected layer.

In some embodiments, each of the layers may include one or more nodes. In some embodiments, each node may be connected to one or more nodes in a previous layer. The number of nodes in each layer may be the same or different. In some embodiments, each node may correspond to an activation function. As used herein, an activation function of a node may define an output of the node given input or a set of inputs. In some embodiments, each connection between two of the plurality of nodes in the initial machine learning model may transmit a signal from one node to another node. In some embodiments, each connection may correspond to a weight. As used herein, a weight corresponding to a connection may be used to increase or decrease the strength or impact of the signal at the connection.

The machine learning model may include a plurality of parameters, such as architecture parameters, learning parameters, etc. Exemplary architecture parameters of the machine learning model may include the size of a kernel of a layer, the total count (or number) of layers, the count (or number) of nodes in each layer, a learning rate, a batch size, an epoch, etc. Exemplary learning parameters may include a connected weight between two connected nodes, a bias vector relating to a node, etc.). Before the training, the machine learning model may have one or more initial parameter values. In the training of the machine learning model, the learning parameters of the machine learning model may be updated. Before the updating process, values of the learning parameters of the machine learning model may be initialized. For example, the connected weights and/or the bias vector of nodes of the initial machine learning model may be initialized by assigning random values in a range, e.g., the range from −1 to 1. As another example, all the connected weights of the initial machine learning model may be assigned the same value in the range from −1 to 1, for example, 0. As still an example, the bias vector of nodes in the initial machine learning model may be initialized by assigning random values in a range from 0 to 1. In some embodiments, the parameters of the initial machine learning model may be initialized based on a Gaussian random algorithm, a Xavier algorithm, etc.

The training of the preliminary machine learning model may include one or more iterations to iteratively update the parameter values of the machine learning preliminary model based on the training data until a termination condition is satisfied in a certain iteration. Exemplary termination conditions may be that the value of a loss function obtained in the certain iteration is less than a threshold value, that a certain count of iterations has been performed, that the loss function converges such that the difference of the values of the loss function obtained in a previous iteration and the current iteration is within a threshold value, etc. The loss function may be used to measure a discrepancy between an estimated air conduction audio signal predicted by the preliminary machine learning model in an iteration based on the bone conduction audio signal and the air conduction audio signal in each group of training data and the reference air conduction audio signal in the group of training data. For example, the bone conduction audio signal and the air conduction audio signal of each group of training data may be inputted into the preliminary machine learning model, and the preliminary machine learning model may output a predicted or estimated air conduction audio signal. The loss function may be used to measure a difference between the predicted air conduction audio signal and the reference second air conduction audio signal of each group of training data. The parameter values of the preliminary machine learning model may be adjusted using, for example, a backpropagation algorithm based on the value of the loss function in the current iteration. Exemplary loss functions may include a focal loss function, a log loss function, a cross-entropy loss, a Dice ratio, or the like. If the termination condition is not satisfied in the current iteration, the processing device 122 may further update the preliminary machine learning model (also referred to as updating parameter values of the preliminary machine learning model) to be used in the next iteration according to, for example, a backpropagation algorithm. If the termination condition is satisfied in the current iteration, the processing device 122 may designate the preliminary machine learning model in the current iteration as the trained machine learning model.

The trained machine learning model may provide a mapping relationship between a specific bone conduction audio signal and a specific air conduction audio signal with an equivalent air conduction audio signal corresponding to the specific bone conduction audio signal. The processing device 122 may determine an equivalent air conduction audio signal corresponding to a specific bone conduction audio signal based on the mapping relationship, the specific bone conduction audio signal, and the specific air conduction audio signal. The specific bone conduction audio signal and the specific air conduction audio signal may be acquired by a bone conduction sensor and an air conduction sensor, respectively when a user speaks. The specific bone conduction audio signal and the specific air conduction audio signal may represent the same speech of the user. The equivalent air conduction audio signal corresponding to the specific bone conduction audio signal may have a noise level less than the specific air conduction audio signal.

In 1008, the processing device 122 (e.g., the determination module 404) may generate, based on the bone conduction audio signal and the air conduction audio signal, a target audio signal representing the speech of the user using the trained first machine learning model. In some embodiments, the target audio signal may have a noise level less than a noise level of the air conduction audio signal.

In some embodiments, the bone conduction audio signal and/or the air conduction audio signal may be inputted into the trained machine learning model, and the trained machine learning model may directly output an equivalent air conduction audio signal. In some embodiments, the processing device 112 may designate the equivalent air conduction audio signal as the target audio signal. In some embodiments, the processing device 112 may process the equivalent air conduction audio signal to obtain the target audio signal as described elsewhere in the present disclosure.

In some embodiments, the bone conduction audio signal and/or the air conduction audio signal may be inputted into the trained machine learning model, and the trained machine learning model may output information related to the target audio signal. For example, the trained machine learning model may output a set of audio data. The processing device 122 may convert the set of audio data into the target audio signal using an algorithm (e.g., a speech synthesis algorithm as described in operation 610).

In 1010, the processing device 122 (e.g., the output module 406) may cause an audio signal output device to output the target audio signal.

In some embodiments, the processing device 122 may transmit a signal to a client terminal (e.g., the terminal 130), the storage device 140, and/or any other storage device (not shown in the audio signal generation system 100) via the network 150. The signal may include the target audio signal. The signal may be also configured to direct the client terminal to play the target audio signal.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer readable program code embodied thereon.

A non-transitory computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system, comprising:
   at least one storage medium including a set of instructions;

at least one processor in communication with the at least one storage medium, wherein when executing the set of instructions, the at least one processor is directed to cause the system to perform operations including:
obtaining a bone conduction audio signal acquired by a bone conduction sensor;
obtaining an air conduction audio signal acquired by an air conduction sensor, the bone conduction audio signal and the air conduction audio signal representing a speech of a user;
obtaining a trained machine learning model that provides a mapping relationship between a set of bone conduction data derived from a specific bone conduction audio signal and one or more sets of equivalent air conduction data derived from a specific equivalent air conduction audio signal;
determining, based on the bone conduction audio signal and the air conduction audio signal, a target set of equivalent air conduction data corresponding to the bone conduction audio signal using the trained machine learning model, the target set of equivalent air conduction data indicating a semantic content of the speech of the user, including:
determining, based on the bone conduction audio signal, a plurality of sets of equivalent air conduction data corresponding to the bone conduction audio signal using the trained machine learning model; and
identifying, based on the air conduction audio signal, the target set of equivalent air conduction data from the plurality of sets of equivalent air conduction data; and
causing, based on the target set of equivalent air conduction data, an audio signal output device to output a target audio signal representing the speech of the user.

2. The system of claim 1, wherein the determining, based on the bone conduction audio signal, a plurality of sets of equivalent air conduction data corresponding to the bone conduction audio signal using the trained machine learning model includes:
inputting the bone conduction audio signal into the trained machine learning model to obtain the plurality of sets of equivalent air conduction data corresponding to the bone conduction audio signal.

3. The system of claim 2, wherein the determining, based on the bone conduction audio signal, a plurality of sets of equivalent air conduction data corresponding to the bone conduction audio signal using the trained machine learning model includes:
extracting bone conduction acoustic characteristics from the bone conduction audio signal;
determining the set of bone conduction data based on the bone conduction acoustic characteristics; and
inputting the set of bone conduction data into the trained machine learning model to obtain the plurality of sets of equivalent air conduction data corresponding to the bone conduction audio signal.

4. The system of claim 2, wherein the identifying, based on the air conduction audio signal, the target set of equivalent air conduction data from the plurality of sets of equivalent air conduction data includes:
extracting air conduction acoustic characteristics from the air conduction audio signal;
determining a set of air conduction data based on the air conduction acoustic characteristics;
for each of the plurality of sets of equivalent air conduction data, determining a correlation degree between the set of equivalent air conduction data and the set of air conduction data;
determining one of the plurality of sets of equivalent air conduction data that has a maximum correlation degree with the set of air conduction data among the plurality of sets of equivalent air conduction data; and
determining, based on the one of the plurality of sets of equivalent air conduction data, the target set of equivalent air conduction data.

5. The system of claim 1, wherein the causing an audio signal output device to output a target audio signal representing the speech of the user based on the target set of equivalent air conduction data includes:
converting the target set of equivalent air conduction data into a target equivalent air conduction audio signal;
determining the target audio signal based on the target equivalent air conduction audio signal; and
causing the audio signal output device to output the target audio signal.

6. The system of claim 5, wherein the target audio signal includes a noise level less than a noise level of the air conduction audio signal.

7. The system of claim 5, wherein the determining the target audio signal based on the target equivalent air conduction audio signal includes:
generating the target audio signal by adding noises in the target equivalent air conduction audio signal.

8. The system of claim 1, wherein the trained machine learning model is provided by a process including:
obtaining a plurality of groups of training data, each group of the plurality of groups of training data including a first audio signal and a second audio signal representing a same speech sample, wherein the first audio signal is acquired by a bone conduction audio acquisition device and the second audio signal is acquired by an air conduction audio acquisition device under a noiseless condition; and
training a preliminary machine learning model using the plurality of groups of training data to obtain the trained machine learning model.

9. The system of claim 8, wherein the preliminary machine learning model is constructed based on a hidden Markov model.

10. The system of claim 8, wherein the training a preliminary machine learning model using the plurality of groups of training data to obtain the trained machine learning model includes;
extracting first acoustic characteristics from the first audio signal;
extracting second acoustic characteristics from the second audio signal;
determining one or more first sets of bone conduction data based on the first acoustic characteristics;
determining one or more second sets of air conduction data based on the second acoustic characteristics;
determining multiple pairs of air conduction data and bone conduction data, each pair includes a first set of bone conduction data and a second set of air bone conduction data that represents same semantics; and
establishing a mapping relationship between each of the one or more first sets of bone conduction data and at least one of the one or more second sets of air conduction data based on the multiple pairs of air conduction data and bone conduction data.

11. The system of claim 10, wherein each of the one or more first sets of bone conduction data and the one or more second sets of air conduction data includes a syllable that is composed of one or more phonemes.

12. The system of claim 1, wherein the trained machine learning model provides a mapping relationship between each syllable in the bone conduction audio signal with one or more syllables in the air conduction audio signal.

13. The system of claim 12, wherein the mapping relationship between each syllable in the bone conduction audio data with one or more syllables in the plurality of sets of equivalent air conduction data includes a probability that each syllable in the bone conduction audio data matches each of one or more syllables in the plurality of sets of equivalent air conduction data.

14. The system of claim 1, wherein each set of the set of bone conduction data and the one or more sets of equivalent air conduction data includes a syllable that is composed of one or more phonemes, or a word that is composed of one or more syllables, or a phrase that is composed of one or more words, or a sentence that is composed of one or more phrases.

15. A method implemented on a computing apparatus, the computing apparatus including at least one processor and at least one storage device, comprising:
obtaining a bone conduction audio signal acquired by a bone conduction sensor;
obtaining an air conduction audio signal acquired by an air conduction sensor, the bone conduction audio signal and the air conduction audio signal representing a speech of a user;
obtaining a trained machine learning model that provides a mapping relationship between a set of bone conduction data derived from a specific bone conduction audio signal and-one or more sets of equivalent air conduction data derived from a specific equivalent air conduction audio signal;
determining, based on the bone conduction audio signal and the air conduction audio signal, a target set of equivalent air conduction data corresponding to the bone conduction audio signal using the trained machine learning model, the target set of equivalent air conduction data indicating a semantic content of the speech of the user, including:
determining, based on the bone conduction audio signal, a plurality of sets of equivalent air conduction data corresponding to the bone conduction audio signal using the trained machine learning model; and
identifying, based on the air conduction audio signal, the target set of equivalent air conduction data from the plurality of sets of equivalent air conduction data; and
causing, based on the target set of equivalent air conduction data, an audio signal output device to output a target audio signal representing the speech of the user.

16. The method of claim 15, wherein the determining, based on the bone conduction audio signal and the air conduction audio signal, a target set of equivalent air conduction data corresponding to the bone conduction audio signal includes:
determining, based on the bone conduction audio signal, a plurality of sets of equivalent air conduction data corresponding to the bone conduction audio signal using the trained machine learning model; and
identifying, based on the air conduction audio signal, the target set of equivalent air conduction data from the plurality of sets of equivalent air conduction data.

17. The method of claim 16, wherein the determining, based on the bone conduction audio signal, a plurality of sets of equivalent air conduction data corresponding to the bone conduction audio signal using the trained machine learning model includes:
extracting bone conduction acoustic characteristics from the bone conduction audio signal;
determining the set of bone conduction data based on the bone conduction acoustic characteristics; and
inputting the set of bone conduction data into the trained machine learning model to obtain the plurality of sets of equivalent air conduction data corresponding to the bone conduction audio signal.

18. The method of claim 16, wherein the identifying, based on the air conduction audio signal, the target set of equivalent air conduction data from the plurality of sets of equivalent air conduction data includes:
extracting air conduction acoustic characteristics from the air conduction audio signal;
determining a set of air conduction data based on the air conduction acoustic characteristics;
for each of the plurality of sets of equivalent air conduction data, determining a correlation degree between the set of equivalent air conduction data and the set of air conduction data;
determining one of the plurality of sets of equivalent air conduction data that has a maximum correlation degree with the set of air conduction data among the plurality of sets of equivalent air conduction data; and
determining, based on the one of the plurality of sets of equivalent air conduction data, the target set of equivalent air conduction data.

19. The method of claim 15, wherein the trained machine learning model is provided by a process including:
obtaining a plurality of groups of training data, each group of the plurality of groups of training data including a first audio signal and a second audio signal representing a same speech sample, wherein the first audio signal is acquired by a bone conduction audio acquisition device and the second audio signal is acquired by an air conduction audio acquisition device under a noiseless condition; and
training a preliminary machine learning model using the plurality of groups of training data to obtain the trained machine learning model.

20. A non-transitory computer readable medium, comprising a set of instructions, wherein when executed by at least one processor, the set of instructions direct the at least one processor to perform acts of:
obtaining a bone conduction audio signal acquired by a bone conduction sensor;
obtaining an air conduction audio signal acquired by an air conduction sensor, the bone conduction audio signal and the air conduction audio signal representing a speech of a user;
obtaining a trained machine learning model that provides a mapping relationship between a set of bone conduction data derived from a specific bone conduction audio signal and one or more sets of equivalent air conduction data derived from a specific equivalent air conduction audio signal;
determining, based on the bone conduction audio signal and the air conduction audio signal, a target set of equivalent air conduction data corresponding to the bone conduction audio signal using the trained machine learning model, the target set of equivalent air conduction data indicating a semantic content of the speech of the user, including:
  determining, based on the bone conduction audio signal, a plurality of sets of equivalent air conduction data corresponding to the bone conduction audio signal using the trained machine learning model; and
  identifying, based on the air conduction audio signal, the target set of equivalent air conduction data from the plurality of sets of equivalent air conduction data; and
causing, based on the target set of equivalent air conduction data, an audio signal output device to output a target audio signal representing the speech of the user.

* * * * *